US012416872B2

(12) United States Patent
Yoshida et al.

(10) Patent No.: US 12,416,872 B2
(45) Date of Patent: Sep. 16, 2025

(54) TONER, DEVELOPING AGENT, TONER STORED UNIT, AND IMAGE FORMING APPARATUS

(71) Applicants: Ryuuta Yoshida, Shizuoka (JP); Toma Takebayashi, Shizuoka (JP); Akio Takei, Shizuoka (JP); Yasuo Kamada, Shizuoka (JP)

(72) Inventors: Ryuuta Yoshida, Shizuoka (JP); Toma Takebayashi, Shizuoka (JP); Akio Takei, Shizuoka (JP); Yasuo Kamada, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 926 days.

(21) Appl. No.: 17/517,359

(22) Filed: Nov. 2, 2021

(65) Prior Publication Data

US 2022/0137525 A1    May 5, 2022

(30) Foreign Application Priority Data

Nov. 4, 2020 (JP) .................. 2020-184496

(51) Int. Cl.
*G03G 9/087* (2006.01)
*B82Y 40/00* (2011.01)
(Continued)

(52) U.S. Cl.
CPC .......... *G03G 9/08755* (2013.01); *C08L 33/06* (2013.01); *G03G 9/0823* (2013.01); (Continued)

(58) Field of Classification Search
CPC .. G03G 9/08755; G03G 9/108; G03G 9/0823; G03G 9/1075; C08L 33/06; B82Y 40/00
See application file for complete search history.

(56) References Cited

U.S. PATENT DOCUMENTS 8,778,588 B2   7/2014  Kusahara et al.
8,999,618 B2   4/2015  Yoshida et al.
(Continued)

FOREIGN PATENT DOCUMENTS

JP    2009-003025    1/2009
JP    2011-164473    8/2011
(Continued)

OTHER PUBLICATIONS

English machine translation of the description of JP-2019143128-A (Year: 2019).*
(Continued)

*Primary Examiner* — Mark F. Huff
*Assistant Examiner* — Boone Alexander Evans
(74) *Attorney, Agent, or Firm* — Grüneberg and Myers PLLC

(57) ABSTRACT

The present disclosure provides a toner having excellent low-temperature fixing, heat-resistant-storage property, cleaning performance, and filming resistance. A toner containing toner base particles having a crystalline polyester resin and an amorphous polyester resin includes a plurality of organic particles disposed at least partially embedded in a surface of the toner base particles. A percentage of the crystalline polyester resin occupying the surface of the toner base particles is 4% to 20%, a volume average particle size of the organic particles is 10 nm to 40 nm, and a standard deviation of a distance between adjacent particles of the organic particles that are not in contact is 500 nm or less.

13 Claims, 4 Drawing Sheets

(51) Int. Cl.
*C08L 33/06* (2006.01)
*G03G 9/08* (2006.01)
*G03G 9/107* (2006.01)

(52) U.S. Cl.
CPC ........... *G03G 9/1075* (2013.01); *G03G 9/108* (2020.08); *B82Y 40/00* (2013.01)

(56) References Cited

U.S. PATENT DOCUMENTS

| | | | |
|---|---|---|---|
| 9,201,326 | B2 | 12/2015 | Yoshida et al. |
| 9,316,938 | B2 | 4/2016 | Watanabe et al. |
| 9,989,869 | B2 | 6/2018 | Inoue et al. |
| 10,073,366 | B2 | 9/2018 | Nagata et al. |
| 10,303,072 | B2 | 5/2019 | Tanaka et al. |
| 10,429,756 | B2 | 10/2019 | Fuwa et al. |
| 10,571,834 | B2 | 2/2020 | Matsuda et al. |
| 10,599,058 | B2 | 3/2020 | Nemoto et al. |
| 10,670,980 | B2 | 6/2020 | Ohnuma et al. |
| 10,884,350 | B2 | 1/2021 | Takebayashi et al. |
| 2013/0011779 | A1 | 1/2013 | Yamashita et al. |
| 2017/0363980 | A1* | 12/2017 | Nagata ................. G03G 9/0904 |
| 2019/0271927 | A1* | 9/2019 | Inoue ................. G03G 9/08795 |
| 2021/0063916 | A1 | 3/2021 | Takei et al. |
| 2021/0116830 | A1 | 4/2021 | Takei et al. |
| 2022/0057725 | A1* | 2/2022 | Inoue ................... G03G 9/0819 |

FOREIGN PATENT DOCUMENTS

| | | | |
|---|---|---|---|
| JP | 2011-197274 | | 10/2011 |
| JP | 2013-029587 | | 2/2013 |
| JP | 2013-114092 | | 6/2013 |
| JP | 2014-067021 | | 4/2014 |
| JP | 2017-227881 | | 12/2017 |
| JP | 6551544 | | 7/2019 |
| JP | 2019143128 A | * | 8/2019 .......... G03G 9/0802 |

OTHER PUBLICATIONS

U.S. Appl. No. 17/318,396, filed May 12, 2021.
Japanese Office Action dated Apr. 23, 2024, in Japanese Application No. 2020-184496, 2 pages.
Japanese Office Action received for Japanese Patent Application No. 2020-184496 mailed on Aug. 6, 2024, 8 pages with English translation.

* cited by examiner

TONER, DEVELOPING AGENT, TONER STORED UNIT, AND IMAGE FORMING APPARATUS

CROSS-REFERENCE TO RELATED APPLICATION

The present application is based on and claims priority under 35 U.S.C. § 119 to Japanese Patent Application No. 2020-184496, filed on Nov. 4, 2020, the contents of which are incorporated herein by reference in their entirety.

BACKGROUND OF THE INVENTION

1. Field of the Invention

The present invention relates to a toner, a developing agent, a toner stored unit, and an image forming apparatus.

2. Description of the Related Art

Imaging devices such as multifunction peripherals (MFPs) and printers that use toner are widely used in offices and various other locations. Toners are required to have low-temperature fixing and heat-resistant-storage in order to save energy by reducing power consumption during fixing, as well as to increase resistance to high-temperature and high humidity during storage and transportation.

As a toner with low-temperature fixing and heat-resistant-storage, for example, a toner including core particles containing crystalline polyester and non-crystalline resin, and a shell formed of resin fine particles adhered in a particulate form to the surface of the core particles, wherein 20% to 60% of the surface area of the core particles is covered by the crystalline polyester, and the coverage of resin particles covering the surface of core particles is 30% to 90%, has been proposed (see, for example, Patent Document 1).

Patent Document 1: Japanese Unexamined Patent Application Publication No. 2011-164473

SUMMARY OF THE INVENTION

However, the toner described in Patent Document 1 was insufficient to achieve both the high level of low-temperature fixing and heat-resistant-storage required in recent years. In addition, Patent Document 1 does not describe cleaning performance, and it may not be possible to sufficiently remove toner adhering to the carrier, photoconductor, cleaning blade, and the like. Furthermore, in the toner described in Patent Document 1, the resin particles covering the surface of the core particles may become detached, thereby causing the core particles to adhere to the charging member such as the photoconductor drum (filming) and the like, and in turn causing degradation of the image quality.

One aspect of the present invention is to provide a toner having excellent low-temperature fixing, heat-resistant-storage, cleaning performance, and filming resistance to/against photoconductor drum.

One aspect of the present invention is to provide a toner containing toner base particles including a crystalline polyester resin and an amorphous polyester resin, including a plurality of organic particles disposed at least partially embedded in a surface of the toner base particles, wherein a percentage of the crystalline polyester resin occupying the surface of the toner base particles is 4% to 20%, wherein a volume average particle size of the organic particles is 10 nm to 40 nm, and wherein a standard deviation of a distance between adjacent particles of the organic particles that are not in contact is 500 nm or less.

One aspect of the present invention is to provide a toner having excellent low-temperature fixing, heat-resistant-storage, cleaning performance, and filming resistance to/against photoconductor drum.

DETAILED DESCRIPTION OF THE PREFERRED EMBODIMENTS

The following is a detailed description of an embodiment of the present invention. Note that embodiments are not limited by the following description, and can be changed as necessary without departing from the gist of the present invention. In addition, in the present specification, "to" indicating a numerical range refers that the numerical values listed before and after the "to" are included as the lower and upper limits, respectively, unless otherwise noted.

<Toner>

A toner according to one embodiment contains toner base particles that contain a crystalline polyester resin and an amorphous (non-crystalline) polyester resin as the binding resin, and a plurality of organic particles that are at least partially embedded in the surface of the toner base particles.

[Percentage of Crystalline Polyester Resin Occupying Surface of Toner Base Particles]

The percentage of crystalline polyester resin occupying the surface of the toner base particles (surface coverage) is 4% to 20%, more preferably 8% to 18%, and even more preferably 10% to 15%. The crystalline polyester rapidly reduces in its viscosity due to melting during the fixing of the toner in one embodiment, and the crystalline polyester is compatible with the amorphous polyester resin and fixed. Due to these properties, the toner of one embodiment exhibits good low-temperature fixing. If the crystalline polyester resin occupies less than 4% of the surface of the toner base particles, the fixing ability of toner deteriorates. If the percentage of crystalline polyester resin occupying the surface of the toner base particles exceeds 20%, the heat-resistant-storage of the toner will decrease. By setting the percentage of crystalline polyester resin occupying the surface of the toner base particles within the above range, both excellent low-temperature fixing and heat-resistant-storage can be achieved.

The percentage of crystalline polyester resin occupying the surface of the toner base particles can be confirmed by cross-sectional observation using a transmission electron microscope (TEM).

The percentage of crystalline polyester resin occupying the surface of the toner base particles can be calculated by staining the toner according to one embodiment with ruthenium, followed by observing the toner cross-section under a transmission electron microscope, and analyzing the resulting image. Specifically, the following method can be used.

Figure 1:
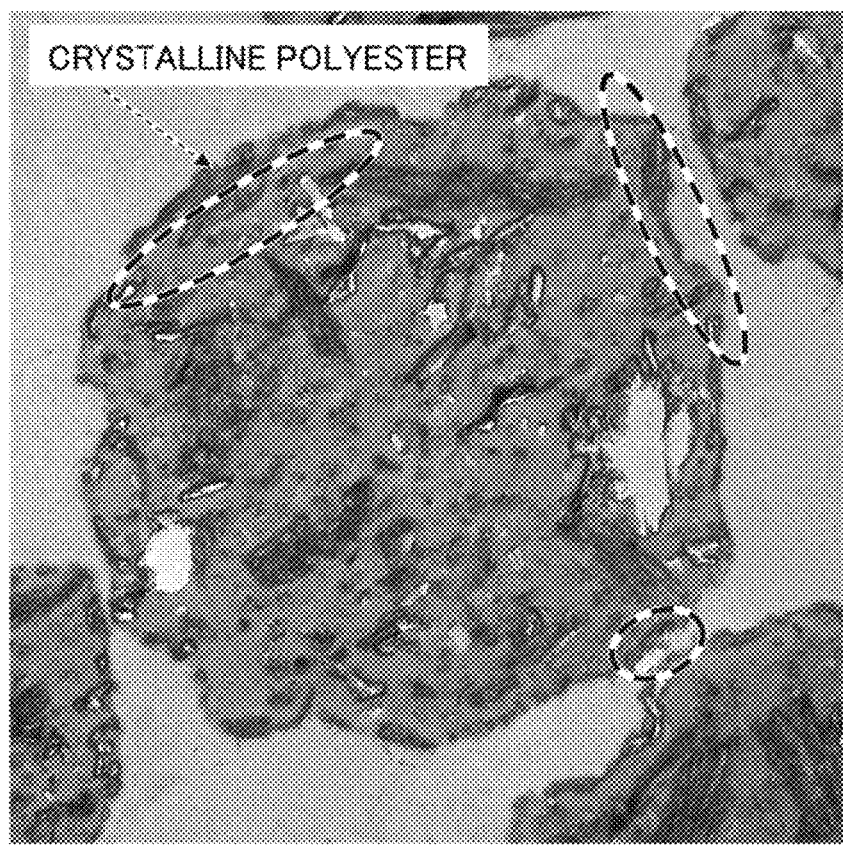
FIG. 1 is a SEM photograph illustrating an example of a cross-section of a toner according to one embodiment.

The toner is encapsulated in epoxy resin and sectioned to a thickness of 100 nm by a microtome. The cross-section of the toner is then observed by TEM to confirm the structure of the crystalline polyester resin in contact with the release agent. A 0.5% aqueous solution of ruthenium tetroxide may be used for staining. The crystalline polyester resin can then be determined from the contrast and shape in the cross-section of the toner of the TEM image. For example, a SEM photograph illustrating an example of a cross-section of a toner of one embodiment is illustrated in FIG. 1. As illustrated in FIG. 1, the linear or lamellar structure-like crystals scattered within the amorphous polyester resin in the toner (see the dashed line in FIG. 1) can be determined to be crystalline polyester resin. It can be adjusted so that one section contains about 50 toner cross-sections.

[Standard Deviation Between Volume Average Particle Size of Organic Particles and Distance Between Organic Particles that are not in Contact]

The organic particles are at least partially embedded in the surface of the toner base particles. The volume average particle size of organic particles is 10 nm to 40 nm. By reducing the particle size of the particles on the surface of the toner base particles, excellent cleaning performance can be maintained without interfering with low-temperature fixing.

The standard deviation of the distance between adjacent organic particles that are not in contact with each other is 500 nm or less, preferably 300 nm or less, and even more preferably 200 nm or less. The organic particles are evenly spaced apart on the surface of the toner base particles, resulting in suppressing the exposure of materials such as crystalline polyester without interfering with the heat transfer to the toner base particles when the toner is fixed. Therefore, heat-resistant-storage of the toner can be improved. In addition, the inventors of the present invention found that when inorganic particles such as silica, titanium, and the like are externally added to the surface of the toner base particles, the adhesion strength can be optimized. As a result, a certain content of inorganic particles is released from the toner base during cleaning. The released inorganic particles are deposited on the contact surface between the cleaning blade and the photoconductor, resulting in good cleaning performance. In addition, the content of inorganic particles released can be kept at an appropriate level, thus preventing the occurrence of filming.

[Crystalline Polyester Resin and Amorphous Polyester Resin]

The toner according to one embodiment includes a polyester resin with crystalline and amorphous polyester resins as the binding resin. The toner according to one embodiment may contain a binder resin other than polyester resin. In addition to the binding resin, the toner according to one embodiment may contain other components such as colorants and release agents, as necessary.

(Crystalline Polyester Resins)

The crystalline polyester resin has thermofusion properties such that the crystalline polyester resin rapidly reduces in viscosity at around a fixing onset temperature thereof owing to high crystallinity thereof. Since the crystalline polyester resin having such properties is used together with the amorphous polyester resin, excellent heat-resistant-storage is obtained up to a melt onset temperature owing to the crystallinity thereof, rapid reduction in viscosity (sharp melt) is caused at a melt onset temperature thereof due to fusion of the crystalline polyester resin to be compatible to the amorphous polyester resin, and the rapid reduction in the viscosity makes a resultant toner to be fixed. Therefore, the toner having both excellent heat-resistant-storage and low-temperature fixing can be obtained. Moreover, an excellent release width (a difference between the minimum fixing temperature and high-temperature offset resistance) is also obtained.

The crystalline polyester resin is obtained using polyvalent alcohol, and polyvalent carboxylic acid or a derivative thereof, such as polyvalent carboxylic acid, polyvalent carboxylic acid anhydride, and polyvalent carboxylic acid ester. In the present embodiment, as described above, the crystalline polyester resin refers to a resin obtained using polyvalent alcohol, and polyvalent carboxylic acid or a derivative thereof, such as polyvalent carboxylic acid, polyvalent carboxylic acid anhydride, and polyvalent carboxylic acid ester, and does not include, for example, a modified polyester resin, such as a prepolymer and a resin obtained through a cross-linking and/or elongation reaction of the prepolymer. The prepolymer is a reaction product of the polyester of the modified polyester in the amorphous polyester resin and the polyisocyanate, that is, a reaction precursor to be reacted with a curing agent, as described below.

The presence or absence of crystallinity in crystalline polyester resin can be confirmed by a crystal analysis X-ray diffractometer (e.g. X'Pert Pro MRD, manufactured by Philipps). The measurement method is described below.

First, the target sample is ground in a mortar to prepare a sample powder, and then the obtained sample powder is uniformly applied to a sample holder. Then, the sample holder is set in the diffractometer and the measurement is carried out to obtain the diffraction spectrum.

The obtained diffraction peaks are determined to be crystalline if the half width of the peak with the highest peak intensity among the peaks obtained in the range of $20°<2\theta<25°$ is 2.0 or less. In contrast to crystalline polyester resins, polyester resins that do not exhibit the above state are referred to as amorphous polyester resins in this embodiment.

The measurement conditions for X-ray diffraction are described below.

[Measurement Conditions]
Tension kV: 45 kV
Current: 40 mA
MPSS Upper Gonio Scan mode: continuous
Start angle: 3°
End angle: 35°
Angle Step: 0.02°
Lucident beam optics Divergence slit: Div slit ½
Deflection beam optics anti scatter slit: As Fixed ½
Receiving slit: Prog rec slit —Polyvalent Alcohol—

The polyvalent alcohol component is not particularly limited and may be appropriately selected according to the intended purpose. Examples of the polyvalent alcohol component include diol, and trivalent or higher alcohol.

Examples of the diol include saturated aliphatic diol. Examples of the saturated aliphatic diol include straight-chain saturated aliphatic diol and branched saturated aliphatic diol. Among the above-listed examples, straight-chain saturated aliphatic diol is preferable, and straight-chain saturated aliphatic diol having 2 or greater but 12 or less carbon atoms is more preferable. When the saturated aliphatic diol is straight-chain saturated aliphatic diol, crystallinity of the crystalline polyester resin is low and therefore a melting thereof may be low. When the number of carbon atoms of the saturated aliphatic diol is greater than 12, it may be difficult to source a material for practical use. The number of carbon atoms is more preferably 12 or less.

Examples of the saturated aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. The above-listed examples may be used alone or in combination. Among the above-listed examples, ethylene glycol, 1,4-butanediol, 1,6-hexanediol, 1,8-octanediol, 1,10-decanediol, and 1,12-dodecanediol are preferable because of high crystallinity of the crystalline polyester resin and excellent sharp melt properties thereof.

Examples of trivalent or higher alcohols include glycerin, trimethylolethane, trimethylolpropane, pentaerythritol, and the like. These may be used alone or in combination of two or more.

—Polyvalent Alcohol—

The polyvalent alcohol component is not particularly limited and may be appropriately selected according to the intended purpose. Examples of the polyvalent alcohol include divalent carboxylic acid and trivalent or higher carboxylic acid.

Examples of the divalent carboxylic acid include: saturated aliphatic dicarboxylic acid, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, 1,18-octadecanedicarboxylic acid, and the like; aromatic dicarboxylic acid such as phthalic acid, isophthalic acid, terephthalic acid, naphthalene-2,6-dicarboxylic acid, malonic acid, mesaconic acid, and the like; and anhydrides and lower alkyl esters (the number of carbon atoms: 1 to 3) of the above-listed dicarboxylic acids.

Examples of the trivalent or higher carboxylic acid include 1,2,4-benzenetricarboxylic acid, 1,2,5-benzenetricarboxylic acid, 1,2,4-naphthalenetricarboxylic acid, anhydrides thereof, and lower alkyl esters (the number of carbon atoms: from 1 through 3) thereof.

The polyvalent carboxylic acid may include, in addition to the saturated aliphatic dicarboxylic acid and the aromatic dicarboxylic acid, dicarboxylic acid having a sulfonic acid group. In addition to the saturated aliphatic dicarboxylic acid and the aromatic dicarboxylic acid, the polyvalent carboxylic acid may further include dicarboxylic acid having a double bond. The above-listed examples may be used alone or in combination.

The crystalline polyester resin is preferably formed of straight-chain saturated aliphatic dicarboxylic acid having 4 to 12 carbon atoms and straight-chain saturated aliphatic diol having 2 to 12 carbon atoms. Specifically, the crystalline polyester resin preferably includes a constitutional unit derived from saturated aliphatic dicarboxylic acid having 4 to 12 carbon atoms and a constitutional unit derived from saturated aliphatic diol having 2 to 12 carbon atoms. The crystalline polyester resin including the above-mentioned structural units has high crystallinity and excellent sharp melting properties. Therefore, use of such a crystalline polyester resin is preferable because excellent low-temperature fixing is exhibited.

A melting point of the crystalline polyester resin is not particularly limited and may be appropriately selected according to the intended purpose. The melting point of the crystalline polyester resin is preferably 60° C. to 80° C. When the melting point of the crystalline polyester resin is 60° C. or higher, the crystalline polyester resin is not easily melted at a low temperature, and therefore heat-resistant-storage of a resultant toner may not be decreased. When the melting point of the crystalline polyester resin is 80° C. or less, the crystalline polyester resin is sufficiently melted with heat applied during fixing, and thus low-temperature fixing will not be decreased.

The melting point of crystalline polyester resin can be determined from the DSC curve obtained in differential scanning calorimetry (DSC). For example, from the DSC curve obtained in the DSC measurement, the DSC curve at the first temperature rise can be selected using the analysis program in the Q-200 system, and the endothermic peak top temperature at the first temperature rise of the target sample can be obtained as the melting point. Similarly, the DSC curve at the time of the second temperature increase can be selected, and the endothermic peak top temperature of the target sample at the second temperature increase can be obtained as the melting point.

A molecular weight of the crystalline polyester resin is not particularly limited and may be appropriately selected according to the intended purpose. The crystalline polyester resin having a sharp molecular weight distribution and a low molecular weight give a resultant toner excellent low-temperature fixing, and a toner having a large content of a small molecular weight component has insufficient heat-resistant-storage, a weight averaged molecular weight (Mw) of an ortho-dichlorobenzene soluble component of the crystalline polyester resin as measured by gel permeation chromatography (GPC) is preferably 3,000 to 30,000, a number averaged molecular weight (Mn) thereof is preferably 1,000 to 10,000, and Mw/Mn is preferably 1.0 to 10. Moreover, the weight averaged molecular weight (Mw) thereof is more preferably 5,000 to 15,000, the number averaged molecular weight (Mn) thereof is more preferably 2,000 to 10,000, and Mw/Mn is more preferably 1.0 to 5.0.

An acid value of the crystalline polyester resin is not particularly limited and may be appropriately selected according to the intended purpose. In order to achieve desired low-temperature fixing considering affinity between paper and the resin, the acid value of the crystalline polyester resin is preferably 5 mgKOH/g or greater, and more preferably 10 mgKOH/g or greater. In order to improve hot offset resistance, on the other hand, the acid value thereof is preferably 45 mgKOH/g or less.

A hydroxyl value of the crystalline polyester resin is not particularly limited and may be appropriately selected according to the intended purpose. In order to achieve desired low-temperature fixing as well as excellent chargeability charging properties, the hydroxyl value of the crystalline polyester resin is preferably 0 mgKOH/g to 50 mgKOH/g, and more preferably 5 mgKOH/g to 50 mgKOH/g.

A molecular structure of the crystalline polyester resin can be confirmed by solution or solid NMR spectroscopy, X-ray diffraction spectroscopy, GC/MS, LC/MS, IR spectroscopy, or the like. As for a simple method thereof, there is a method where a compound giving an infrared absorption spectrum having absorption based on δCH (out plane bending) of olefin at 965±10 cm$^{-1}$ and 990±10 cm$^{-1}$ is detected as the crystalline polyester resin.

A content of the crystalline polyester resin is not particularly limited and may be appropriately selected according to the intended purpose. The content of the crystalline polyester resin is preferably 3 parts by mass to 20 parts by mass, and more preferably 5 parts by mass to 15 parts by mass, relative to 100 parts by mass. When the content thereof is 3 parts by mass or greater, sufficient sharp-melting properties of a resultant toner are obtained owing to the crystalline polyester resin, and excellent low-temperature fixing is obtained. When the content thereof is 20 parts by mass or less, moreover, excellent heat-resistant-storage is obtained, and thus image cover-up will be decreased. When the content is within the more favorable range, it is advantageous in that it is excellent in all aspects of high image quality and low-temperature fixing.

(Amorphous Polyester Resin)

The amorphous polyester preferably contains a diol component and a dicarboxylic acid component as constituent components, and preferably contains 40% by mol or more of alkylene glycol. The polyester resin component may or may not contain a crosslinking component as the constituent components.

—Diol Component—

The diol component is not particularly limited and may be appropriately selected according to the intended purpose. Examples of the diol include: aliphatic diol, such as ethylene glycol, 1,2-propyleneglycol, 1,3-propyleneglycol, 1,4-butanediol, 2-methyl-1,3-propanediol, 3-methyl-1,5-pentanediol, 1,6-hexanediol, 1,8-octanediol, 1,10-decanediol, and 1,12-dodecanediol; diol including an oxyalkylene group, such as diethylene glycol, triethylene glycol, dipropylene glycol, polyethylene glycol, polypropylene glycol, polytetramethylene glycol; alicyclic diol, such as 1,4-cyclohexanedimethanol, and hydrogenated bisphenol A; products obtained adding alkylene oxide (e.g., ethylene oxide, propylene oxide, and butylene oxide) to alicyclic diol; bisphenols, such as bisphenol A, bisphenol F, and bisphenol S; and alkylene oxide adducts of bisphenols, such as products obtained by adding alkylene oxide (e.g., ethylene oxide, propylene oxide, and butylene oxide) to bisphenols. Among the above-listed examples, aliphatic diol having 4 or more but 12 or less carbon atoms is preferable. The above-listed diols may be used alone or in combination.

—Dicarboxylic Acid Component—

The dicarboxylic acid is not particularly limited and may be appropriately selected according to the intended purpose. Examples of the dicarboxylic acid include aliphatic dicarboxylic acid, and aromatic dicarboxylic acid. Moreover, anhydrides thereof, lower alkyl esters (the number of carbon atoms: 1 to 3) thereof, or halogenated product thereof may be used.

The aliphatic dicarboxylic acid is not particularly limited and may be appropriately selected according to the intended purpose. Examples thereof include succinic acid, adipic acid, sebacic acid, dodecanedioic acid, maleic acid, and fumaric acid.

The aromatic dicarboxylic acid is not particularly limited and may be appropriately selected according to the intended purpose, and is preferably aromatic dicarboxylic acid having 8 to 20 carbon atoms.

The aromatic dicarboxylic acid having 8 to 20 carbon atoms is not particularly limited and may be appropriately selected according to the intended purpose. Examples thereof include phthalic acid, isophthalic acid, terephthalic acid, and naphthalene dicarboxylic acid. Among the above-listed examples, aromatic dicarboxylic acid having 8 to 12 carbon atoms is preferable. One of the above-listed dicarboxylic acids may be used alone or two or more may be used in combination.

The amorphous polyester resin is preferably a linear polyester resin. The amorphous polyester resin is preferably an unmodified polyester resin. An unmodified polyester resin is a polyester resin obtained by using polyhydric alcohols and polyvalent carboxylic acids or their derivatives, such as polyvalent carboxylic acids, polyvalent carboxylic anhydrides, and polyvalent carboxylic esters, and is not modified by isocyanate compounds or the like.

Examples of polyvalent alcohols include diols. The diols include, for example, polyoxypropylene (2.2)-2,2-bis(4-hydroxyphenyl) propane, polyoxyethylene (2.2)-2,2-bis(4-hydroxyphenyl)propane, or the like; alkylene (2 to 3 carbon atoms) oxide (average number of moles added: 1 to 10) adducts of bisphenol A; ethylene glycol, propylene glycol; hydrogenated bisphenol A, hydrogenated bisphenol A alkylene (2 to 3 carbon atoms) oxide (average number of moles added: 1 to 10) adducts of hydrogenated bisphenol A. One of these may be used alone, or two or more may be used in combination.

Examples of the polyvalent carboxylic acid include, for example, dicarboxylic acids. Dicarboxylic acids include, for example, adipic acid, phthalic acid, isophthalic acid, terephthalic acid, fumaric acid, maleic acid, and succinic acid substituted with an alkyl group of 1 to 20 carbons or an alkenyl group of 2 to 20 carbons, such as dodecenyl succinic acid, octyl succinic acid, and the like. In particular, the polyvalent carboxylic acid preferably contains 50% by mol or more of terephthalic acid. One of these may be used alone, or two or more may be used in combination.

The amorphous polyester resin may contain at least one of a trivalent or higher carboxylic acid and a trivalent or higher alcohol at the end of its resin chain in order to adjust the acid value and hydroxyl group value.

Examples of the trivalent or higher carboxylic acid include trimellitic acid, pyromellitic acid, and their acid anhydrous.

There are no particular limitations on the trivalent or higher alcohols, and the trivalent or higher alcohols can be selected according to the purpose. Examples of trivalent or higher alcohols include aliphatic alcohols of trivalent or higher, polyphenols of trivalent or higher, and alkylene oxide adducts of polyphenols of trivalent or higher.

Examples of trivalent or higher aliphatic alcohols include glycerin, trimethylol ethane, trimethylol propane, pentaerythritol, sorbitol, and the like.

Examples of trivalent or higher polyphenols include trisphenol PA, phenol novolac, cresol novolac, and the like.

Examples of alkylene oxide adducts of polyphenols of trivalent or higher include polyphenols of trivalent or higher to which an alkylene oxide such as ethylene oxide, propylene oxide, butylene oxide, and the like is added.

Polyisocyanate

The polyisocyanate is not particularly limited and may be appropriately selected according to the intended purpose. Examples thereof include diisocyanate, trivalent or higher isocyanate, and the like.

Examples of the diisocyanate include aliphatic diisocyanate, alicyclic diisocyanate, aromatic diisocyanate, aromatic aliphatic diisocyanate, isocyanurate, and products obtained by blocking the above-listed polyisocyanates with a phenol derivative, oxime, caprolactam, and the like.

The aliphatic diisocyanate is not particularly limited and may be appropriately selected according to the intended purpose. Examples of the aliphatic diisocyanate include tetramethylene diixocyanate, hexamethylene diisocyanate, 2,6-diisocyanatocaproic acid methyl ester, octamethylene diisocyanate, decamethylene diisocyanate, dodecamethylene diisocyanate, tetradecamethylene diisocyanate, trimethylhexane diisocyanate, tetramethylhexane diisocyanate, and the like.

The alicyclic diisocyanate is not particularly limited and may be appropriately selected according to the intended purpose. Examples thereof include isophorone diisocyanate, cyclohexylmethane diisocyanate, and the like.

The aromatic diisocyanate is not particularly limited and may be appropriately selected according to the intended purpose. Examples thereof include tolylene diisocyanate, diisocyanatodiphenyl methane, 1,5-naphthylenediisocyanate, 4,4'-diisocyanatodiphenyl, 4,4'-diisocyanato-3,3'-dimethyldiphenyl, 4,4'-diisocyanato-3-methyldiphenylmethane, 4,4'-diisocyanato-diphenyl ether, and the like.

The aromatic aliphatic diisocyanate is not particularly limited and may be appropriately selected according to the intended purpose. Examples of the aromatic aliphatic diisocyanate include α,α,α',α'-tetramethylxylenediisocyanate and the like.

The isocyanurate is not particularly limited and may be appropriately selected according to the intended purpose. Examples thereof include tris(isocyanatalkyl)isocyanurate, tris(isocyanatocycloalkyl)isocyanurate, and the like. One of the above-listed polyisocyanates may be used alone or two or more may be used in combination.

Trivalent or higher isocyanates include, for example, lysine triisocyanate, or trivalent alcohols reacted with diisocyanate, or polyisocyanate reacted and isocyanurated. Among them, polyisocyanate with an isocyanurate backbone is more preferably used, as it acts as a stronger cross-linking point and is even more superior in heat preservation and high-temperature offset resistance.

The trivalent isocyanate is preferably 0.2 mol % to 1.0 mol % of the resin composition in the THF-insoluble portion of the toner. When a cross-linked structure is formed by trivalent isocyanate, the cohesive force of the molecular chain is increased by pseudo-cross-linking with urethane or urea bonds at the cross-linking point, which improves the heat storage even with a small cross-linking density, and thus a high level of low-temperature fixing can be achieved. If the trivalent isocyanate component is less than 0.2 mol %, the branching structure may not be formed sufficiently, and the heat-resistant-storage and film-forming resistance may deteriorate due to the starting point of the part where the network structure becomes non-uniform. If the trivalent isocyanate component is greater than 1.0 mol %, the low-temperature fixing may deteriorate due to the formation of a dense cross-linked structure.

The amorphous polyester resin component preferably contains a cross-linking component. The cross-linking component preferably contains an aliphatic alcohol of trivalent or higher value, and the cross-linking component more preferably contains an aliphatic alcohol of trivalent or tetravalent value in terms of gloss and image density of the fixed image. The trivalent or tetravalent aliphatic alcohol is preferably a trivalent or tetravalent aliphatic polyhydric alcohol component having 3 to 10 carbon atoms. The cross-linking component may alternatively be only a trivalent or higher aliphatic alcohol.

The trivalent or higher aliphatic alcohol can be appropriately selected according to the intended purpose. Examples of the trivalent or higher aliphatic alcohols include glycerin, trimethylolethane, trimethylolpropane, pentaerythritol, sorbitol, dipentaerythritol, and the like. One of the above-listed trivalent or higher aliphatic alcohols may be used alone or two or more may be used in combination.

Although trivalent or higher carboxylic acids and epoxy compounds can be used as the cross-linking component of the amorphous polyester resin component, trivalent or higher aliphatic alcohols as the cross-linking component is more preferably used from the viewpoint that irregularities are less likely to occur and sufficient gloss and image density can be obtained.

The molecular weight of the amorphous polyester resin component is not particularly limited, and the molecular weight of the amorphous polyester resin component can be selected according to the purpose. However, if the molecular weight is too low, the toner's heat-resistant-storage and durability against stresses such as agitation in the developing machine may be reduced. If the molecular weight is too high, the viscoelasticity of the toner when melted increases, and low-temperature fixing may decrease. If there are too many components with a molecular weight of 600 or less, the toner's heat-resistant-storage and durability against stresses such as agitation in the developing machine may decrease, and if there are too few components with a molecular weight of 600 or less, the toner's low-temperature fixing may decrease.

Therefore, in GPC measurement, the weight averaged molecular weight Mw is preferably 3,000 to 10,000, and the number averaged molecular weight Mn is preferably 1,000 to 4000. In addition, Mw/Mn is preferably 1.0 to 4.0. Furthermore, the weight averaged molecular weight Mw is more preferably 4,000 to 7,000, the number averaged molecular weight Mn is more preferably 1,500 to 3,000, and Mw/Mn is more preferably 1.0 to 3.5.

The component with a molecular weight of 600 or less in the THF soluble content is preferably 2% by mass to 10% by mass. The polyester resin may be extracted with methanol to remove and purify the component with a molecular weight of 600 or less.

The acid value of amorphous polyester resin is not particularly limited and can be selected according to the purpose. The acid value of amorphous polyester resin is preferably 1 mgKOH/g to 50 mgKOH/g and more preferably 5 mgKOH/g to 30 mgKOH/g. When the acid value is 1 mg KOH/g or higher, the toner can easily become negatively charged, and furthermore, the affinity between the paper and toner becomes better when fixing to the paper, improving low-temperature fixing. On the other hand, if the acid value exceeds 50 mgKOH/g, the charging stability, especially against environmental changes, may decrease.

The hydroxyl value of amorphous polyester resin is not particularly limited and can be selected according to the purpose. The hydroxyl value of amorphous polyester resin is preferably 5 mgKOH/g or higher.

The glass transition temperature Tg of amorphous polyester resin is preferably 40° C. to 65° C., more preferably 45° C. to 65° C., and even more preferably 50° C. to 60° C. When the glass transition temperature Tg is 40° C. or higher, the toner's heat-resistant-storage and durability against stresses such as agitation in the developing machine are improved, and the filming resistance is also improved. On the other hand, if the glass transition temperature Tg is 65° C. or lower, the toner deforms well when heated and pressurized during fixing, and low-temperature fixing is improved.

The content of the amorphous polyester resin component is preferably 80 parts by mass to 90 parts by mass with respect to 100 parts by mass of toner.

(Polyester Resin Insoluble in Tetrahydrofuran (Modified Polyester))

The toner base particles may contain a polyester resin that imparts plasticity to the toner base particles (hereafter referred to as modified polyester). The polyester resin insoluble in tetrahydrofuran (THF) in the toner base particles has a branched structure in the molecular skeleton and the molecular chain has a three-dimensional network structure, while lowering the glass transition temperature Tg and melt viscosity to ensure low-temperature fixing. Therefore, the toner base particles can have rubber-like properties that deform at low temperatures but do not flow.

Modified polyester has a structure represented by any of the following structural formulae (1) to (3), where the modified polyester has a structure in which $R_2$, which is a polyester or modified polyester portion, and $R_1$ corresponding to a branched structure are bonded by a urethane or urea group.

$$R_1\text{—}(NHCONH\text{—}R_2)_n\text{—} \quad (1)$$

$$R_1\text{—}(NHCOO\text{—}R_2)_n\text{—} \quad (2)$$

$$R_1\text{—}(OCONH\text{—}R_2)_n\text{—} \quad (3)$$

(In the above formula, n=3, $R_1$ represents an isocyanurate skeleton, and $R_2$ represents a group derived from the resin of either a polyester containing polycarboxylic acid and polyol, or a modified polyester in which the polyester has been isocyanate-modified.

The modified polyester has at least one of urethane and urea bonds in the branched structure portion. Therefore, the urethane or urea bond behaves like a pseudo-crosslinking point, strengthening the rubber-like properties of the modified polyester and making it possible to prepare a toner with excellent heat-resistant-storage and high-temperature offset resistance.

Modified polyesters have no particular limitations as long as $R_2$, which corresponds to polyester or modified polyester, and $R_1$, which corresponds to the branched structure portion, are bonded by a urethane or urea group and can be selected appropriately according to the purpose.

The methods of bonding $R_1$ and $R_2$ are not limited to, but include the following.

(a) A method of reacting an ester with a diol component and a dicarboxylic acid component to produce a polyester polyol ($R_2$) with a hydroxyl group at the end, and then the resulting polyester polyol is reacted with isocyanurates ($R_1$).

(b) A method of reacting an ester with a diol component and a dicarboxylic acid component to produce a polyester polyol ($R_2$) with a hydroxyl group at the end, the reaction of the resulting polyester polyol with a divalent polyisocyanate to produce an isocyanate-modified polyester ($R_2$), and the reaction of the resulting isocyanate-modified polyester with isocyanurates ($R_1$) in the presence of pure water.

The residual hydroxyl groups in the polyol obtained by either (a) and (b) above can be further reacted with a divalent or higher polyisocyanate to form a prepolymer, which is then reacted with a curing agent in the toner production process.

During the toner production process, at least one of the urethane and urea bonds is generated by the reaction with the curing agent and behaves like a strong crosslinking point, which makes the rubber-like properties of the modified polyester stronger and further improves the heat-resistant-storage and high-temperature offset resistance. Therefore, the resin of the modified polyester with the $R_2$ portion modified by isocyanate is preferably used.

In order to lower the glass transition temperature Tg of the modified polyester and to facilitate the imparting of the property of deformation at low temperatures, the modified polyester contains a diol component as a constituent. The diol component preferably contains an aliphatic diol with 3 or more and 12 or less of carbon atoms, and more preferably an aliphatic diol with 4 or more and 12 or less of carbon atoms.

The modified polyesters preferably contain 50 mol % or more of aliphatic diols with 3 to 12 carbon atoms, more preferably 80 mol- or more, and even more preferably 90 mol % or more.

Examples of aliphatic diols with 3 to 12 carbon atoms include 1,3-propanediol, 1,4-butanediol, 2-methyl-1,3-propanediol, 1,5-pentanediol, 3-methyl-1,5-pentanediol, 1,6-hexanediol, 1,8-octanediol, 1,10-decanediol, 1,12-dodecanediol, and the like.

In particular, it is even more preferable that the diol component in the modified polyester is an aliphatic diol with 4 to 12 carbon atoms, the carbon atoms of the main chain of the diol component is an odd number, and the diol component has an alkyl group in the side chain.

As an aliphatic diol with 4 to 12 carbon atoms in the main chain with an odd number of carbons and an alkyl group in the side chain, for example, the aliphatic diol represented by the following general formula (1) can be mentioned.

$$HO\text{—}(CR_1R_2)_n\text{—}OH \quad (1)$$

In Formula (1), $R_1$ and $R_2$ each independently represent a hydrogen atom or an alkyl group with 1 to 3 carbon atoms. n represents an odd number from 3 to 9. In n repeating units, $R_1$ may be the same or different from each other. In each of the n repeating units, $R_2$ may be the same or may be different from each other.

In order to lower the glass transition temperature Tg of the modified polyester and to facilitate imparting of the property of deformation at low temperatures, the amorphous polyester resin preferably contains 50 mol % or more of aliphatic diols with 3 to 12 carbon atoms in the total alcohol component.

In order to lower the glass transition temperature Tg of the modified polyester and to facilitate imparting of the property of deformation at low temperatures, the amorphous polyester resin preferably contains a dicarboxylic acid component as a constituent, and the dicarboxylic acid component preferably contains an aliphatic dicarboxylic acid with 4 to 12 carbon atoms.

The polyester resin preferably contains 30 mol % or more of aliphatic dicarboxylic acid with 4 to 12 carbon atoms.

Examples of aliphatic dicarboxylic acid with 4 to 12 carbon atoms include succinic acid, glutaric acid, adipic acid, pimelic acid, suberic acid, azelaic acid, sebacic acid, dodecanedioic acid, and the like.

[Amorphous Hybrid Resins]

The toner base particles preferably contain one or more composite resins containing a condensation polymerization resin and a styrene resin in the toner base particles, and to contain an amorphous hybrid resin in which two polymerization resin components with independent reaction paths are partially chemically bonded and at least one of the two polymerization resin components contains a resin component of the same polymerization system as the polyester resin. Accordingly, the dispersibility of the crystalline polyester resin in the toner base particles can be improved. In addition, controlling the exposure of crystalline polyester to the toner base particle surface and uniform dispersion of crystalline polyester inside the toner base particle can contribute to both low-temperature fixing and heat-resistant-storage.

The toner base particles preferably contain, in addition to a mixture of the raw material monomers of the two polymerization resins, each of which has an independent reaction path, a resin obtained by mixing, as one of the raw material monomers, a monomer that can react with any of the raw material monomers of the two polymerization resins (bi-reactive monomer).

The bi-reactive monomer is preferably a monomer having at least one functional group selected from the group consisting of a hydroxyl group, a carboxyl group, an epoxy group, a primary amino group, and a secondary amino group, and an ethylenically unsaturated bond in the molecule. The dispersibility of the resin that is the dispersed phase can be improved by using such bi-reactive monomer. Examples of bi-reactive monomers include acrylic acid, fumaric acid, methacrylic acid, citraconic acid, maleic acid, and the like. Among these, acrylic acid, methacrylic acid, and fumaric acid are preferably used.

The content of both reactive monomers used is preferably 0.1 parts by mass to 10 parts by mass with respect to 100 parts by mass of the raw monomer of the condensation polymerization resin. In the present embodiment, both reactive monomers are treated as different monomers from the raw material monomers of condensation polymerization resins and additive polymerization resins because the both reactive monomers have specific characteristics.

In the present embodiment, when the hybrid resin is obtained by conducting two polymerization reactions using the above raw material monomer mixture and both reactive monomers, the progress and completion of the polymerization reactions need not be simultaneous in time. The reaction temperature and time may be selected according to the respective reaction mechanism, and the reaction may proceed to completion.

For example, the following method is preferred for the production of hybrid resins. First, the raw monomers of the condensation polymerization resin, the raw monomers of the additive polymerization resin, both reactive monomers, and catalysts such as polymerization initiators are mixed. Then, an additive polymerization resin component with functional groups capable of having a condensation polymerization reaction is obtained mainly by radical polymerization reaction at 50° C. to 180° C. Subsequently, after the reaction temperature is increased to 190° C. to 270° C., the condensation polymerization reaction is mainly conducted to form the condensation polymerization resin component.

The softening point of amorphous hybrid resins is 80° C. to 170° C., preferably 90° C. to 160° C., and more preferably 95° C. to 155° C.

The weight ratio of the crystalline polyester resin to the amorphous hybrid resin is not particularly limited. The ratio of the polyester resin to amorphous hybrid resin is preferably 50/100 to 200/100.

The raw monomer of the condensation polymerization resin is preferably a succinic acid derivative as the carboxylic acid component.

Styrene derivatives such as styrene, α-methylstyrene, vinyltoluene, and the like are used as raw material monomers of styrene resins.

The content of styrene derivatives is preferably 50% by mass or more, more preferably 70% by mass or more, and even more 80% by mass or more in the raw monomers of styrene resins.

Examples of the raw material monomers for styrene resins that can be used in addition to styrene derivatives include (meth)acrylic acid alkyl ester; ethylenically unsaturated monoolefins such as ethylene, propylene, and the like; diolefins such as butadiene and the like; halovinyl chloride such as vinyl chloride and the like; vinyl esters such as vinyl acetate, vinyl propionate, and the like; esters of ethylenic monocarboxylic acids such as (meth)acrylic acid dimethylaminoethyl and the like; vinyl ethers such as vinyl methyl ether and the like; vinylidene halides such as vinylidene chloride and the like; N-vinyl compounds such as N-vinylpyrrolidone and the like.

Among these, (meth)acrylic acid alkyl esters are preferably used from the standpoint of low-temperature fixing and charge stability of the toner. From the above perspective, the number of carbons in the alkyl group in (meth)acrylic acid alkyl esters is preferably 1 to 22 and more preferably 8 to 18. The carbon number of an alkyl ester is the carbon number derived from the alcohol component that forms the ester. Specifically, methyl (meth)acrylate, ethyl (meth)acrylate, (iso)propyl (meth)acrylate, 2-hydroxyethyl (meth)acrylate, (iso- or tertiary) butyl (meth)acrylate, 2-ethylhexyl (meth) acrylate, (iso)octyl (meth)acrylate, (iso)decyl (meth)acrylate, (iso)stearyl (meth)acrylate, and the like.

The content of (meth)acrylic acid alkyl ester is preferably 50% by mass or less, more preferably 30% by mass or less, and even more preferably 20% by mass or less in the raw monomer of the styrene resin, from the viewpoint of the toner's low-temperature fixing, storage property, and charging stability.

The content of the hybrid resin is not particularly limited and can be selected according to the purpose. The content of the hybrid resin is preferably 15% by mass or more with respect to the number of parts of the crystalline polyester. If the content is less than 15% by mass, the effect of internal dispersion of crystalline polyesters is weak, and excess crystalline polyesters may be placed on the surface.

The glass transition temperature $Tg_{1st}$ at the first rise in temperature of DSC of the toner in one embodiment is 40° C. to 65° C. As the THF-insoluble component of the toner, the glass transition temperature $Tg_{1st}$ at the first rise in temperature of DSC is −45° C. to 5° C. The glass transition temperature $Tg_{2nd}$ at the second rise in temperature of DSC of the THF-soluble component of the toner is preferably 20° C. to 65° C.

The glass transition temperatures $Tg_{1st}$ and $Tg_{2nd}$ can be determined from the DSC curve obtained in DSC measurements. For example, from the DSC curve obtained in the DSC measurement, the DSC curve at the first temperature rise can be selected using the analysis program in the Q-200 system, and the glass transition temperature $Tg_{1st}$ at the first temperature rise of the target sample can be obtained. Similarly, the DSC curve at the second temperature rise can be selected to obtain the glass transition temperature $Tg_{2nd}$ at the second temperature rise of the target sample.

(Curing Agent)

A curing agent is not particularly limited as long as the curing agent can react with the prepolymer (the reaction product of the polyester and polyisocyanate in the $R_2$ in the above structural formulae (1) to (3) of the prepolymer, that is, the reaction precursor to be reacted with the curing agent) to produce polyester resin and can be selected according to the purpose. Examples of curing agents include compounds containing active hydrogen groups.

—Active Hydrogen Groups-Containing Compounds—

Active hydrogen groups-containing compounds are not particularly limited and selected according to the purpose. Examples of the active hydrogen groups include hydrogen groups (alcoholic hydroxyl groups and phenolic hydroxyl groups), amino groups, carboxyl groups, and mercapto groups. One of the above-listed active hydrogen groups may be used alone or two or more may be used in combination.

The active hydrogen group-containing compounds are not particularly limited and selected according to the purpose. Amines are preferably used because of their ability to form urea bonds.

Amines are not particular limited and can be suitably selected according to the purpose. Examples of amines include diamines, trivalent or higher amines, amino alcohols, aminomercaptans, amino acids, and those with their block amino groups. One of the above-listed amines may be used alone or two or more in combination. Among these, diamine and a mixture of diamine and small content of trivalent or higher amine are preferably used.

Diamines are not particularly limited and can be suitably selected according to the purpose. Examples of diamines include aromatic diamines, alicyclic diamines, aliphatic diamines, and the like. The aromatic diamines are not particularly limited, and can be suitably selected according to the purpose. Examples of the aromatic diamines include phenylenediamine, diethyltoluenediamine, 4,4'-diaminodiphenylmethane, and the like. The alicyclic diamines are not particularly limited and can be suitably selected according to the purpose. Examples of the alicyclic diamines include 4,4'-diamino-3,3'-dimethyldicyclohexylmethane, diaminocyclohexane, isophoronediamine, and the like. The aliphatic diamines are not particularly limited and can be suitably selected according to the purpose. Examples of the aliphatic diamines include ethylenediamine, tetramethylenediamine, hexamethylenediamine, and the like.

Trivalent or higher amines are not particularly limited and can be selected according to the purpose. Examples of the trivalent or higher amines include diethylenetriamine, triethylenetetramine, and the like.

Amino alcohols are not particularly limited and can be selected according to the purpose. Examples of amino alcohols include ethanol amine, hydroxyethylaniline, and the like.

Amino mercaptans are not particularly limited and can be selected according to the purpose. Examples of the amino mercaptans include aminoethyl mercaptan, aminopropyl mercaptan, and the like.

Amino acids are not particularly limited can be selected according to the purpose. Examples of the amino acids include aminopropionic acid, aminocaproic acid, and the like.

Amines with block amino groups are not particularly limited and can be selected according to the purpose. Examples of the amines with block amino groups include ketimine compounds, oxazoline compounds, and the like obtained by blocking the amino group with ketones such as acetone, methyl ethyl ketone, methyl isobutyl ketone, and the like.

The glass transition temperature Tg of modified polyesters is preferably −60° C. or higher and 0° C. or lower, and more preferably −40° C. or higher and −20° C. or lower. If the glass transition temperature Tg is less than −60° C., the flow of toner at low temperatures cannot be controlled, and the heat-resistant-storage deteriorates, and the filming resistance may also deteriorate. If the glass transition temperature exceeds 0° C., the toner cannot be sufficiently deformed by heating and pressurization during fixing, and the low-temperature fixing may be insufficient.

The weight averaged molecular weight of modified polyesters is not particularly limited and can be selected according to the purpose. The weight averaged molecular weight is preferably 20,000 or more and 1,000,000 or less based on GPC measurement.

The weight averaged molecular weight of modified polyesters is the molecular weight of the reaction product of reacting the reactive precursor with the curing agent.

If the weight averaged molecular weight is less than 20,000, the toner tends to flow at low temperature and may have poor heat-resistant-storage.

In addition, the viscosity when melted becomes low, and high-temperature offsetting properties may be reduced.

A content of modified polyester is not particularly limited and can be selected according to the purpose. The content is preferably 1 parts by mass to 15 parts by mass and more preferably 5 parts by mass to 10 parts by mass with respect to 100 parts by mass of the toner.

[Organic Particles]

The organic particles are contained in a state that are at least partially embedded in the surface of the toner base particles. The organic particles are arranged in a scattered manner on the surface of the toner base particles, rather than in a layered manner covering the surface of the toner base particles.

The organic particles are preferably one or more styrene acrylic resins with at least a carboxylic acid, and are obtained by single or copolymerization of vinyl monomers.

The organic particles are preferably composed of two types of styrene acrylic resin (a1) and (a2), and are more preferably to have a core-shell structure with styrene acrylic resin (a1) as the shell and styrene acrylic resin (a2) as the core.

(Resin (a1))

Resin (a1) is a polymer formed from single polymerization or copolymerization of vinyl monomers. The following (1) to (10) are listed as vinyl monomers.

(1) Vinyl Hydrocarbon

The vinyl hydrocarbons include (1-1) aliphatic vinyl hydrocarbons, (1-2) alicyclic vinyl hydrocarbons, and (1-3) aromatic vinyl hydrocarbons.

(1-1) Aliphatic Vinyl Hydrocarbon

Aliphatic vinyl hydrocarbons include alkenes, alkadienes, and the like. Examples of alkenes include ethylene, propylene, α-olefins, and the like. Specific examples of alkadiene include butadiene, isoprene, 1,4-pentadiene, 1,6-hexadiene, 1,7-octadiene, and the like.

(1-2) Alicyclic Vinyl Hydrocarbon

Alicyclic vinyl hydrocarbons include mono- or di-cycloalkenes and alkadienes. Examples of alicyclic vinyl hydrocarbons include (di)cyclopentadiene, terpene, and the like.

(1-3) Aromatic Vinyl Hydrocarbon

Aromatic vinyl hydrocarbons include styrene and its hydrocarbyl (alkyl, cycloalkyl, aralkyl and/or alkenyl) substituted forms. Examples of aromatic vinyl hydrocarbons include alpha-methylstyrene, 2,4-dimethylstyrene, vinylnaphthalene, and the like.

(2) Carboxyl Group-Containing Vinyl Monomers and Salts Thereof

Carboxyl group-containing vinyl monomers and salts thereof include 3 to 30 carbon atoms of unsaturated monocarboxylic acids (salts), unsaturated dicarboxylic acids (salts), and their anhydrides (salts), and their monoalkyl (1 to 24 carbon atoms) esters or salts thereof.

Examples of carboxyl group-containing vinyl monomers and salts thereof include (meth)acrylic acid, (anhydride) maleic acid, maleic acid monoalkyl ester, fumaric acid, fumaric acid monoalkyl ester, crotonic acid, itaconic acid, itaconic acid monoalkyl ester, itaconic acid glycol monoether, citraconic acid, citraconic acid monoalkyl ester, cinnamic acid, and the like.

In the present embodiments, "(salt)" refers to an acid or salt thereof. For example, 3 to 30 carbon atoms of an unsaturated monocarboxylic acid (salt) refers to an unsaturated monocarboxylic acid or salt thereof.

The term "(meth)acrylic" refers to methacrylic acid or acrylic acid. In other words, the term "(meth)acryloyl" refers to methacryloyl or acryloyl, and the term "(meth)acrylate" refers to methacrylate or acrylate.

(3) Sulfonic Group-Containing Vinyl Monomers, Vinyl Sulfate Monoesterifieds, and Salts Thereof Sulfonic group-containing vinyl monomers, vinyl sulfate monoesterifieds, and salts thereof include 2 to 14 carbon atoms of alkenesulfonic acid (salt), 2 to 24 carbon atoms of alkylsulfonic acid (salt), sulfo(hydroxy) alkyl-(meth)acrylate (salt) or (meth)acrylamide (salt), alkylaryl sulfosuccinic acid (salt), and the like. Examples of 2 to 14 carbon atoms of alkenesulfonic acid (salt) include vinyl sulfonic acid (salt) and the like. Examples of 2 to 24 carbon atoms of alkyl sulfonic acid (salt) include α-methylstyrene sulfonic acid (salt) and the like. Sulfo(hydroxy)alkyl-(meth)acrylate(salt) or (meth)acrylamide (salt) includes sulfopropyl (meth)acrylate (salt), sulfate ester (salt), vinyl monomer containing sulfonic acid groups (salt), and the like.

(4) Phosphate Group-Containing Vinyl Monomers and Salts Thereof

Examples of phosphate group-containing vinyl monomers and salts thereof include (meth)acryloyloxyalkyl (1 to 24 carbon atoms) phosphate monoesters (salts), (meth)acryloyloxyalkyl (1 to 24 carbon atoms) phosphonic acids (salts), and the like.

Examples of (meth)acryloyloxyalkyl (1 to 24 carbon atoms) of phosphoric acid monoesters (salts) include 2-hydroxyethyl (meth)acryloylphosphate (salt), phenyl-2-acryloyloxyethylphosphate (salt), and the like.

Examples of (meth)acryloyloxyalkyl (1 to 24 carbon atoms) phosphonic acids (salts) include 2-acryloyloxyethyl phosphonic acid (salt) and the like.

The salts of (2) to (4) above include, for example, alkali metal salts (sodium salts, potassium salts, and the like), alkaline earth metal salts (calcium salts, magnesium salts, and the like), ammonium salts, amine salts, and quaternary ammonium salts.

(5) Hydroxyl Group-Containing Vinyl Monomers

Examples of hydroxyl group-containing vinyl monomers include hydroxystyrene, N-methylol (meth)acrylamide, hydroxyethyl (meth)acrylate, hydroxypropyl (meth)acrylate, polyethylene glycol mono (meth)acrylate, (meth)allyl alcohol, crotyl alcohol, isocrotyl alcohol, 1-buten-3-ol, 2-buten-1-ol, 2-buten-1,4-diol, propargyl alcohol, 2-hydroxyethylpropenyl ether, sucrose allyl ether, and the like.

(6) Nitrogen-Containing Vinyl Monomer

Examples of nitrogen-containing vinyl monomers include amino group-containing vinyl monomers, amide-group-containing vinyl monomers, nitrile group-containing vinyl monomers, quaternary ammonium cation group-containing vinyl monomers, nitro group-containing vinyl monomers, and the like.

Examples of amino group-containing vinyl monomers include aminoethyl (meth)acrylate and the like.

Examples of amide group-containing vinyl monomers include (meth)acrylamide, N-methyl (meth)acrylamide, and the like.

Examples of nitrile group-containing vinyl monomers include (meth)acrylonitrile, cyanostyrene, cyanoacrylate, and the like.

Examples of quaternary ammonium cationic group-containing vinyl monomers include quaternized tertiary amine groups-containing vinyl monomers such as dimethylaminoethyl (meth)acrylate, diethylaminoethyl (meth)acrylate, dimethylaminoethyl (meth)acrylamide, diethylaminoethyl (meth)acrylamide, diallylamine, and the like (quaternized monomers using quaternizing agents such as methylchloride, dimethyl sulfate, benzyl chloride, dimethyl carbonate, and the like).

Examples of nitro group-containing vinyl monomers include nitrostyrene and the like.

(7) Epoxy Group-Containing Vinyl Monomer

Epoxy group-containing vinyl monomers include glycidyl (meth)acrylate, tetrahydrofurfuryl (meth)acrylate, p-vinylphenylphenyl oxide, and the like.

(8) Halogen Elements-Containing Vinyl Monomer

Halogen elements-containing vinyl monomers include vinyl chloride, vinyl bromide, vinylidene chloride, allyl chloride, chlorstyrene, bromstyrene, dichlorstyrene, chloromethylstyrene, tetrafluorostyrene, chloroprene, and the like.

(9) Vinyl Ester, Vinyl (Thio)Ether, Vinyl Ketone (9-1) Examples of vinyl esters include vinyl acetate, vinyl butyrate, vinyl propionate, vinyl butyrate, diallyl phthalate, diallyl adipate, isopropenyl acetate, vinyl methacrylate, methyl 4-vinyl benzoate, cyclohexyl methacrylate, benzyl methacrylate phenyl (meth)acrylate, vinyl methoxyacetate, vinyl benzoate, ethyl alpha-ethoxyacrylate, 1 to 50 carbon atoms of alkyl (meth)acrylates [methyl (meth)acrylate, ethyl (meth)acrylate, propyl (meth)acrylate, butyl (meth)acrylate, 2-ethylhexyl (meth)acrylate, dodecyl (meth)acrylate, hexadecyl (meth)acrylate, heptadecyl (meth)acrylate, octadecyl (meth)acrylate, eicosyl (meth)acrylate, behenyl (meth)acrylate, etc.)], dialkylfumarate (two alkyl groups are straight-chain, branched-chain, or 2 to 8 carbon atoms of alicyclic groups), dialkylmaleate (two alkyl groups are straight-chain, branched-chain, or 2 to 8 carbon atoms of alicyclic groups), poly(meth)aryloxyalkane [poly(meth)aryloxyalkane (meth)aryloxyalkanes [diaryloxyethane, triaryloxyethane, tetraaryloxyethane, tetraaryloxypropane, tetraaryloxybutane, tetra metaaryloxyethane, or the like], vinyl monomers with polyalkylene glycol chains [polyethylene glycol (molecular weight 300) mono(meth)acrylate, polypropylene glycol (molecular weight 500) mono(meth)acrylate, methyl alcohol ethylene oxide 10 mole adduct (meth)acrylate, lauryl alcohol ethylene oxide 30 mole adduct (meth)acrylate, or the like], poly(meth)acrylate [poly(meth)acrylates of polyhydric alcohols: ethylene glycol di(meth)acrylate, propylene glycol di(meth)acrylate, neopentyl glycol di(meth)acrylate, trimethylolpropane tri(meth)acrylate, polyethylene glycol di(meth)acrylate, or the like], acrylate, and the like].

(9-2) Vinyl (thio)ether includes, for example, vinyl methyl ether and the like.

(9-3) Vinyl ketone

Examples of vinyl ketones include vinyl methyl ketone and the like.

(10) Other Vinyl Monomers

Examples of other vinyl monomers include tetrafluoroethylene, fluoroacrylate, isocyanatoethyl (meth)acrylate, m-isopropenyl-α,α-dimethylbenzyl isocyanate, and the like.

Resin (a1) may use one of the vinyl monomers in (1) to (12) above alone or in combination with two or more of them.

The resin (a1) preferably contains styrene-(meth)acrylic acid ester copolymer and (meth)acrylic acid ester copolymer, and more preferably contains styrene-(meth)acrylic acid ester copolymer, in terms of low-temperature fixing of organic particles.

(Resin (a2))

Resin (a2) can be a polymer made by homopolymerization of a vinyl monomer having a carboxyl group or copolymerization of the homopolymerization of a vinyl monomer having a carboxyl group with other monomers. As vinyl monomers, the same polymers as those used for the above resin (a1) can be used.

Resin (a2) is a resin having methacrylic acid and/or acrylic acid. The content of methacrylic acid and/or acrylic acid is preferably 10% by mass to 60% by mass in total, and more preferably from 30% by mass to 50% by mass in total, with respect to the total mass of resin (a2).

In the same manner as the resin (a1), the resin (a2) is preferably a styrene-(meth)acrylic acid ester copolymer and a (meth)acrylic acid ester copolymer from the standpoint of low-temperature fixing of organic particles, and even more preferably a styrene-(meth)acrylic acid ester copolymer.

The loss elastic modulus G" of viscoelastic properties of the resin (a1) at 100° C. at a frequency of 1 Hz is 1.5 MPa to 100 MPa, preferably 1.7 MPa to 30 MPa, and even more preferably 2.0 MPa to 10 MPa.

The loss elastic modulus G" of viscoelastic properties of the resin (a2) at 100° C. at a frequency of 1 Hz is 0.01 MPa to 1.0 MPa, preferably 0.02 MPa to 0.5 MPa, and even more preferably 0.05 MPa to 0.3 MPa. In this range, the toner particles with organic particles containing the resin (a1) and resin (a2) as components in the same particle attached to the surface of the toner particle can be easily formed.

The loss elastic modulus G" of viscoelastic properties of the resins (a1) and (a2) at 100° C. at a frequency of 1 Hz can be adjusted by changing the types of constituent monomers and their composition ratios, as well as the polymerization conditions (type and content of initiator and chain transfer agent used, and reaction temperature, or the like).

Specifically, each G" can be adjusted to the aforementioned range by using the following composition.

(1) For the glass transition temperature Tg1 calculated from the constituent monomers of resin (a1) and the glass transition temperature Tg2 calculated from the constituent monomers of resin (a2), the glass transition temperature Tg1 is preferably 0° C. to 150° C., and even more preferably 50° C. to 100° C. The glass transition temperature Tg2 is preferably −30 to 100° C., more preferably 0° C. to 80° C., and even more preferably 30° C. to 60° C.

The glass transition temperature, Tg, calculated from the constituent monomers is a value that can be calculated using the Fox method.

The Fox method [T. G. Fox, Phys. Rev. 86, 652 (1952)] is a method for estimating the Tg of a copolymer from the Tg of individual homopolymers as indicated in the following equation.

$$1/Tg = W1/Tg1 + W2/Tg2 + \ldots + Wn/Tgn$$

(In the equation, Tg represents the glass transition temperature of the copolymer (expressed in absolute temperature), Tg1, Tg2 . . . Tgn represents the glass transition temperature of the homopolymer of each monomer component (expressed in absolute temperature), and W1, W2 . . . Wn represents the weight fraction of each monomer component.)

(2) For the calculated acid value (AV1) of the resin (a1) and the calculated acid value (AV2) of the resin (a2), the calculated acid value (AV1) is preferably 75 mgKOH/g to 400 mgKOH/g and even more preferably 150 mgKOH/g to 300 mgKOH/g.

The calculated acid value (AV2) is 0 mgKOH/g to 50 mgKOH/g, more preferably 0 mgKOH/g to 20 mgKOH/g, and most preferably 0 mgKOH/g.

The calculated acid value is the theoretical acid value calculated from the molar amount of acidic groups contained in the constituent monomer and the total weight of the constituent monomers.

As the constituent monomer satisfying the conditions of (1) and (2), for example, as for the resin (a1), styrene is preferably contained as the constituent monomer by 10% by mass to 80% by mass and more preferably by 30% by mass to 60% by mass based on the total mass of resin (a1). In addition, for the resin(a1), at least one of methacrylic acid and acrylic acid is preferably contained by a total of 10% by mass to 60% by mass and more preferably by a total of 30% by mass to 50% by mass based on the total mass of resin (a1).

Furthermore, as for the resin (a2), for example, styrene is preferably contained as the constituent monomer by 10% by mass to 100% by mass and more preferably by 30% by mass to 90% by mass based on the total mass of the resin (a2). In addition, as for the resin (a2), at least one of methacrylic acid and acrylic acid is preferably contained by a total of 0% by mass to 7.5% by mass and even more preferably by a total of 0% by mass to 2.5% by mass based on the total mass of the resin (a2).

(3) By adjusting the polymerization conditions (type and content of initiator and chain transfer agent used, reaction temperature, or the like), as for the number averaged molecular weight Mn1 and Mn2 of the resin (a1) and resin (a2), the number averaged molecular weight Mn1 can be preferably set in the range of 2,000 to 2,000,000 and more preferably 20,000 to 200,000, and the number averaged molecular weight Mn2 can be preferably set in the range of 1,000 to 1,000,000 and more preferably 10,000 to 100,000.

The loss elastic modulus G" of the viscoelastic properties is measured, for example, using the following viscoelasticity measurement device.

Equipment: ARES-24A (manufactured by Rheometric)
Jig: 25 mm parallel plate
Frequency: 1 Hz
Strain rate: 10%
Temperature rise rate: 5° C./min The acid value (AVa1) of the resin (a1) is preferably 75 mgKOH/g to 400 mgKOH/g and even more preferably 150 mgKOH/g to 300 mgKOH/g. In this range, the particles in which the resin fine particles containing a vinyl group including the resin (a1) and resin (a2) as constituent components in the same particle are attached to the surface of the toner particle can be easily formed.

In the resin (a1) in which an acid value is in the above range, the resin (a1) is a resin in which methacrylic acid and/or acrylic acid is preferably contained by a total of 10% by mass to 60% by mass and even more preferably by a total of 30% by mass to 50% by mass based on the total mass of resin (a1).

From the viewpoint of low-temperature fixing, the acid value AVa2 of the resin (a2) is preferably 0 mgKOH/g to 50 mgKOH/g, more preferably 0 mgKOH/g to 20 mgKOH/g, and even more preferably 0 mgKOH/g.

In the resin (a2) in which an acid value is in the above range, the resin (a2) is a resin in which methacrylic acid and/or acrylic acid is preferably contained by a total of 0% by mass to 7.5% by mass and even more preferably by a total of 0% by mass to 2.5% by mass based on the total mass of resin (a2).

The acid value in the present embodiment is determined by the method in accordance with JIS K0070:1992.

The glass transition temperature Tg of the resin (a1) is preferably higher than the glass transition temperature Tg of the resin (a2). In this range, excellent balance between ease of formation of toner particles in which the resin fine particles are attached to the toner surface and the low-temperature fixing of the toner in one embodiment can be achieved.

The glass transition temperature Tg of the resin (a1) is even more preferably 10° C. or higher than the glass transition temperature Tg of the resin (a2), and especially preferably 20° C. or higher than the glass transition temperature Tg of the resin (a2).

The glass transition temperature Tg of the resin (a1) is preferably 0° C. to 150° C. and even more preferably 50° C. to 100° C. If the glass transition temperature Tg of the resin (a1) is 0° C. or higher, the organic resin particles have excellent storage property, and if the temperature is 150° C. or lower, there is less interference to the low-temperature fixing of the organic resin particles.

The glass transition temperature Tg of the resin (a2) is preferably −30° C. to 100° C., more preferably 0° C. to 80° C., and most preferably 30° C. to 60° C. If the glass transition temperature Tg of the resin (a2) is −30° C. or higher, the storage property of the organic particles becomes excellent, and if the temperature is 100° C. or lower, there is less interference to the low-temperature fixing of the organic particles.

The glass transition temperature Tg is measured by the method (DSC) in accordance with ASTM D3418-82 using "DSC20, SSC/580, manufactured by Seiko Instruments Inc.

A soluble parameter of the resin (a1) (hereinafter referred to as SP value) is preferably 9 $(cal/cm^3)^{1/2}$ to 13 $(cal/cm^3)^{1/2}$, more preferably 9.5 $(cal/cm^3)^{1/2}$ to 12.5 $(cal/cm^3)^{1/2}$, and even more preferably 10.5 $(cal/cm^3)^{1/2}$ to 11.5 $(cal/cm^3)^{1/2}$ from the standpoint of ease of formation of the toner in which the resin fine particles containing the resin (a1) and resin (a2) in the same particle as constituent components attached to the surface of the toner base particles.

The SP value of the resin (a1) can be adjusted by changing the types of constituent monomers and its constituent ratios.

A SP value of the resin (a2) is preferably 8.5 $(cal/cm^3)^{1/2}$ to 12.5 $(cal/cm^3)^{1/2}$, more preferably 9 $(cal/cm^3)^{1/2}$ to 12 $(cal/cm^3)^{1/2}$, and even more preferably 10 $(cal/cm^3)^{1/2}$ to 11 $(cal/cm^3)^{1/2}$ from the standpoint of ease of formation of the toner in which the resin fine particles containing the resin (a1) and resin (a2) in the same particle as constituent components attached to the surface of the toner base particles.

The SP value of the resin (a2) can be adjusted by changing the types of constituent monomers and its constituent ratios.

The SP value in the present embodiment is calculated by the method by Fedors [Polym. Eng. Sci. 14 (2) 152, (1974)].

The resin (a1) preferably contains styrene as a constituent monomer by 10% by mass to 80% by mass and more preferably 30% by mass to 60% by mass based on the total mass of the resin (a1), from the viewpoint of the glass transition temperature Tg of the resin (a1) and copolymerization with other monomers.

The resin (a2) preferably contains styrene as a constituent monomer by 10% by mass to 100% by mass and more preferably 30% by mass to 90% by mass based on the total mass of the resin (a2), from the viewpoint of the glass transition temperature Tg of the resin (a2) and copolymerization with other vinyl monomers.

The number averaged molecular weight Mn of the resin (a1) is preferably 2,000 to 2,000,000 and more preferably 20,000 to 200,000. If the number averaged molecular weight Mn is 2,000 or more, the organic particles have excellent storage properties, and if the number averaged molecular weight Mn is 2,000,000 or less, there is less interference with the low-temperature fixing of the organic particles in the present embodiment.

The weight averaged molecular weight of the resin (a1) should be larger than that of the resin (a2). If the weight averaged molecular weight of resin (a1) is larger than the weight averaged molecular weight of resin (a2), excellent balance between an ease of formation of tone in which the organic particles are attached to the surface of the toner base particles and the low-temperature fixing of the toner in one embodiment can be achieved.

The weight averaged molecular weight Mw of the resin (a1) is preferably 1.5 times or greater than the weight averaged molecular weight Mw of the resin (a2), and particularly preferably 2.0 times or greater.

The weight averaged molecular weight Mw of the resin (a1) is preferably 20,000 to 20,000,000, and more preferably 200,000 to 2,000,000. If the weight averaged molecular weight Mw of the resin (a1) is 20,000 or more, the organic particles have excellent storage properties. If the weight averaged molecular weight Mw of the resin (a1) is 20,000,000 or less, there is less interference of the low-temperature fixing of the organic particles.

The number averaged molecular weight Mn of the resin (a2) is preferably 1,000 to 1,000,000, and more preferably 1,000 to 100,000. If the number averaged molecular weight Mn of the resin (a2) is 1,000 or more, the organic particles have excellent storage properties. If the number averaged molecular weight Mn of the resin (a2) is 1,000,000 or less, there is less interference of the low-temperature fixing of the organic particles.

The weight averaged molecular weight Mw of the resin (a2) is preferably 10,000 to 10,000,000, and more preferably 100,000 to 1,000,000. If the weight averaged molecular weight Mw of the resin (a2) is 10,000 or more, the organic particles have excellent storage properties. If the weight averaged molecular weight Mw of the resin (a2) is 10,000,000 or less, there is less interference of the low-temperature fixing of the organic particles.

Among them, the weight averaged molecular weight Mw of resin (a1) is preferably 200,000 to 2,000,000, and the weight averaged molecular weight Mw of resin (a2) is preferably 100,000 to 500,000. In addition, the relation preferably satisfies "weight averaged molecular weight Mw of resin (a1)">"weight averaged molecular weight Mw of resin (a2)".

In the present embodiment, the number averaged molecular weight Mn and the weight averaged molecular weight Mw can be measured using gel permeation chromatography (GPC) under the following conditions.

Equipment: HLC-8120 [manufactured by Tosoh Corporation]
Columns: Two "TSK GEL GMH6" [manufactured by Tosoh Corporation]
Measurement temperature: 40° C.
Sample solution: 0.25% s by mass tetrahydrofuran solution (the insoluble portion was filtered out by a glass filter)
Injection volume: 100 μl
Detection device: Refractive index detector
Reference material: Standard polystyrene (TSK standard POLYSTYRENE) 12 points (molecular weight: 500, 1050, 2800, 5970, 9100, 18100, 37900, 96400, 190000, 355000, 1090000, 2890000) [manufactured by Tosoh Corporation]

The weight ratio of the resin (a1) to the resin (a2) in the organic particles is preferably 5/95 to 95/5, more preferably 25/75 to 75/25, and even more preferably 40/60 to 60/40. If the weight ratio of the resin (a1) to the resin (a2) is 5/95 or more, the toner according to one embodiment has excellent heat storage properties. If the weight ratio of the resin (a1) to the resin (a2) is 95/5 or less, a toner in which the organic particles are attached to the surface of the toner base particles can be easily formed.

Furthermore, organic particles can be used alone, or organic particles (A) consisting of two types of styrene acrylic resins (resins (a1) and (a2)) and organic particles (B) consisting of one type of styrene acrylic resin can be used together. The organic particles (A) and (B) mixed in advance during emulsification adhere evenly to the surface of the toner base particles, and the washing step described below removes all or part of the organic particles (B) and the resin (a1) in the organic particles (A) attached to the surface of the toner base particles, allowing the organic particles (A) to adhere evenly with voids between them.

Examples of the methods of producing the organic particles (A) containing the resin (a1) and the resin (a2) in the same particle as constituent component include publicly known production methods. For example, the following production methods (I) to (V) and the like are publicly known.

(I) A method of conducting a seed polymerization of the constituent monomers of the resin (a2) using the fine particles of the resin (a1) in an aqueous dispersion as a seed.

(II) A method of conducting a seed polymerization of the constituent monomers of the resin (a1) using the fine particles of the resin (a2) in an aqueous dispersion as a seed.

(III) A method of emulsifying a mixture of the resin (a1) and the resin (a2) into an aqueous medium to obtain an aqueous dispersion of resin fine particles.

(IV) A method of emulsifying a mixture of the resin (a1) and the resin (a2) into an aqueous medium, followed by polymerizing the constituent monomers of the resin (a2) to obtain an aqueous dispersion of organic particles.

(V) A method of emulsifying a mixture of the resin (a2) and the resin (a1) into an aqueous medium, followed by polymerizing the constituent monomers of the resin (a1) to obtain an aqueous dispersion of organic particles.

The organic particles (A) contains the resin (a1) and the resin (a2) as constituent components in the same particle is confirmed by observing the elemental mapping image of the cross-sectional surface of the organic fine particle (A) using a publicly known surface elemental analysis device (TOF-SIMS, EDX-SEM, or the like) and is confirmed by observing the electron microscopic image of the cross-sectional surface of the organic fine particle (A) stained with a staining agent corresponding to the functional groups contained in the resin (a1) and the resin (a2).

Furthermore, in addition to organic particles (A) that contain the resin (a1) and the resin (a2) as constituent components in the same particle, organic particles (B) that contain only the resin (a1) as a constituent resin component and resin fine particles that contain only the resin (a2) as a constituent resin component may be obtained as a mixture. In the composite step described below, the mixture may be used as is, or only the organic particles (A) may be isolated and used.

Specific examples of (I) include the following methods. First, the constituent monomers of the resin (a1) are polymerized dropwise to produce an aqueous dispersion of resin fine particles containing the resin (a1). Then, seed polymerization of the constituent monomers of (a2) is carried out using the aqueous dispersion as a seed, and the (a1) produced in advance by solution polymerization or the like is emulsified and dispersed in water. The emulsion dispersion is then used as a seed for the seed polymerization of the constituent monomers that constitute the resin (a2).

Specific examples of (II) include the following methods. First, the constituent monomers of the resin (a2) are polymerized dropwise to produce an aqueous dispersion of resin fine particles containing the resin (a2). Then, seed polymerization of the constituent monomers of (a1) is carried out using the aqueous dispersion as a seed, and the (a2) produced in advance by solution polymerization or the like is emulsified and dispersed in water. The emulsion dispersion is then used as a seed for the seed polymerization of the constituent monomers that constitute the resin (a1).

A specific example of (III) is the method of mixing a solution or melt containing the resin (a1) and the resin (a2) produced in advance by solution polymerization, or the like, and then emulsifying and dispersing this mixture in an aqueous medium.

As specific examples of (IV), the following methods can be conducted. First, the resin (a1) produced in advance by solution polymerization or the like is mixed with the constituent monomers of the resin (a2). The resulting mixture is emulsified and dispersed in an aqueous medium, and the constituent monomers of the resin (a2) are polymerized in the emulsion dispersion to produce resin (a1). The mixture is then emulsified and dispersed in an aqueous medium, and the constituent monomers of the resin (a2) are polymerized in the emulsion dispersion.

As specific examples of (V), the following methods can be conducted. First, the resin (a2) produced in advance by solution polymerization or the like is mixed with the constituent monomers of the resin (a1). The resulting mixture is emulsified and dispersed in an aqueous medium, and the constituent monomers of the resin (a1) are polymerized in the emulsion dispersion to produce resin (a2). The mixture is then emulsified and dispersed in an aqueous medium, and the constituent monomers of the resin (a1) are polymerized in the emulsion dispersion.

Any of the production methods (I) to (V) is suitable.

The organic particles (A) are preferably used as an aqueous dispersion solution, and as the aqueous medium of the dispersion solution, any liquid with water as an essential component can be used without restriction. In the present embodiment, the surface of the toner is provided with organic particles and even a surfactant. Therefore, the aqueous medium includes an aqueous solution of water and a surfactant.

The particle size of the organic particles is preferably 10 nm to 100 nm. If the particle size is less than 10 nm, the coverage on the toner surface will be high and the low-temperature fixing may be reduced. If the particle size exceeds 100 nm, the voids on the toner surface become larger and the effect of heat-resistant-storage property decreases.

The particle size of the organic particles can be measured using a laser Doppler particle size analyzer by adding the sample to be measured to the analyzer using a dropper or syringe. The measurement conditions are as follows.

(Measurement Conditions)
 Equipment: nanotrac UPA-150EX (manufactured by Nikkiso Co., Ltd.)
 Distribution display: Volume
 Number of channels: 52
 Measurement time: 30 seconds
 Particle refractive index: 1.81
 Temperature: 25° C.
 Particle shape: spherical
 Viscosity (CP): High-temperature viscosity: 0.797
 Low temperature viscosity: 1.002
 Refractive index of solvent: 1.333
 Solvent: water The content of organic particles A in the toner is preferably 0.2% by mass to 5% by mass. If the content is less than 0.2% by mass, the effect of heat-resistant-storage cannot be sufficiently obtained. If the content exceeds 5%, the interference of low-temperature fixing becomes significant.

The content of organic particulates A in the toner can be measured using a pyrolysis gas chromatograph equipment. The measurement method is as follows.

(Measurement Conditions)
- Gas chromatograph equipment: 7890B (manufactured by Agilent Technologies)
- Pyrolysis equipment: EGA/PY-3030D (Frontier Labs)
- Pyrolysis condition temperature: 600° C.
- Interface temperature: 400° C.
- Detector temperature: 320° C.
- Oven temperature: 50° C. (10 min)-<10° C./min>-150° C. (0 min)-<20° C./min>-320° C. (3.5 min)
- Column: UA5-30M-1F (30 m×0.25 mm i.d., 1.0 μm film)
- Detector: FID The organic particles (B) can be obtained in the same manner as resin (A), which consists of one type of styrene acrylic resin. As with the organic particles (A), the organic particles (B) can be preferably used as an aqueous dispersion solution, and as the aqueous medium of the dispersion solution, any liquid having water as an essential constituent component can be used without restriction.

In the present embodiment, the organic particles and surfactant are provided on the surface of the toner. Therefore, a solution containing water with a surfactant (D) as an aqueous medium can be used.

Examples of the surfactants (D) includes a nonionic surfactant (D1), an anionic surfactant (D2), a cationic surfactant (D3), an amphoteric surfactant (D4), and other emulsification dispersants (D5).

In addition, appropriate contents of sodium acetate, sodium citrate, sodium bicarbonate, or the like can be used as buffering agents as needed. As protective colloids, water-soluble cellulose compounds and alkali metal salts of polymethacrylic acid can be used in appropriate contents. These may be used alone, or in combination with two or more other types.

Examples of the nonionic surfactants (D1) include AO additive-type nonionic surfactants, polyhydric alcohol-type nonionic surfactants, and the like.

Examples of the AO additive-type nonionic surfactants include EO additives of aliphatic alcohols of 10 to 20 carbon atoms, EO additives of phenol, EO additives of nonylphenol, EO additives of alkylamines of 8 to 22 carbon atoms, EO additives of poly(oxypropylene) glycol, and the like.

Examples of the polyhydric alcohol-type nonionic surfactants include fatty acid (8 to 24 carbon atoms) esters of polyhydric (3 to 8 or more valent) alcohols (2 to 30 carbon atoms) (e.g., glycerol monostearate, glycerol monooleate, sorbitan monolaurate, sorbitan monooleate, and the like) and alkyl (4 to 24 carbon atoms) poly (degree of polymerization 1 to 10) glycosides, and the like.

Examples of the anionic surfactants (D2) include ether carboxylic acids having hydrocarbon group of 8 to 24 carbon atoms or salts thereof, sulfates or ether sulfates having hydrocarbon group of 8 to 24 carbon atoms and salts thereof, sulfonic acid salts having hydrocarbon group of 8 to 24 carbon atoms, sulfosuccinic acid salts having one or two hydrocarbon group of 8 to 24 carbon atoms, phosphate esters or ether phosphate esters having hydrocarbon group with 8 to 24 carbon atoms and salts thereof, fatty acid salts having hydrocarbon group of 8 to 24 carbon atoms, and acylated amino acid salts having hydrocarbon group of 8 to 24 carbon atoms.

Specifically, ether carboxylic acids having hydrocarbon group of 8 to 24 carbon atoms or salts thereof include sodium lauryl ether acetate, (poly)oxyethylene (number of added moles 1 to 100) sodium lauryl ether acetate, and the like.

Sulfate esters or ether sulfate esters having a hydrocarbon group of 8 to 24 carbon atoms and salts thereof include sodium lauryl sulfate, sodium (poly)oxyethylene (number of added moles 1 to 100) lauryl sulfate, (poly)oxyethylene (number of added moles 1 to 100) lauryl sulfate triethanolamine, sodium (poly)oxyethylene (number of added moles 1 to 100) coconut oil fatty acid monoethanolamide sulfate, and the like.

Sulfonates having hydrocarbon groups of 8 to 24 carbon atoms include sodium dodecylbenzene sulfonate and the like.

Phosphate esters or ether phosphates having hydrocarbon groups of 8 to 24 carbon atoms and salts thereof include sodium lauryl phosphate, (poly)oxyethylene (number of added moles 1 to 100) sodium lauryl ether phosphate, and the like.

Fatty acid salts having hydrocarbon groups of 8 to 24 carbon atoms include sodium laurate, triethanolamine laurate, and the like.

Acylated amino acid salts having hydrocarbon groups of 8 to 24 carbon atoms include sodium coconut fatty acid methyl taurine, sodium coconut fatty acid sarcosine, coconut fatty acid sarcosine triethanolamine, N-coconut fatty acid acyl-L-glutamate triethanolamine, sodium N-coconut fatty acid acyl-L-glutamate, sodium lauroylmethyl-β-alanine, and the like.

The cationic surfactants (D3) include quaternary ammonium salt type and amine salt type. Examples of the quaternary ammonium salt types include stearyltrimethylammonium chloride, behenyltrimethylammonium chloride, distearyldimethylammonium chloride, aminopropyl ethyldimethylammonium sulfate, and the like. Examples of the amine salt types include stearic acid diethylaminoethylamide lactate, dilaurylamine hydrochloride, oleylamine lactate, and the like.

The amphoteric surfactants (D4) include betaine type amphoteric surfactants, amino acid type amphoteric surfactants, and the like.

Examples of the betaine type amphoteric surfactants include coconut oil fatty acid amidopropyl dimethylaminoacetate betaine, lauryl dimethylaminoacetate betaine, 2-alkyl-N-carboxymethyl-N-hydroxyethyl imidazolinium betaine, lauryl hydroxysulfobetaine, and the like.

Amino acid-type amphoteric surfactants include sodium β-laurylaminopropionate and the like.

Other emulsification dispersants (D5) are not particularly limited as long as the other emulsification dispersants include reactive activators [having radical reactivity]. Examples other emulsification dispersants include ADEKA REASOAP (registered trademark, manufactured by ADEKA Co., Ltd.) SE-10N, SR-10, SR-20, SR-30, ER-20, ER-30, Aqualon (registered trademark, manufactured by Daiichi Kogyo Seiyaku) HS-10, KH-05, KH-10, KH-1025, ELEMINOL (registered trademark, manufactured by Sanyo Chemical) JS-20, LATEMUL (registered trademark, manufactured by Kao Corporation) PD-104, PD-420, PD-430, IONET (registered trademark, manufactured by Sanyo Chemical Industries, Ltd.) MO-200], polyvinyl alcohol, starch and its derivatives, cellulose derivatives such as carboxymethyl cellulose, methyl cellulose, and hydroxyethyl cellulose, carboxyl group-containing (co)polymers such as sodium polyacrylate, and emulsifying dispersants with urethane or ester groups (e.g., polycaprolactone polyol and polyether diol linked by polyisocyanate) as described in U.S. Pat. No. 5,906,704.

Examples of surfactants (D) preferably include nonionic surfactants (D1), anionic surfactants (D2), other emulsion dispersants (D5), and combinations of these from the viewpoint of stabilizing the oil droplets and obtaining the desired shape while sharpening the particle size distribution during emulsification and dispersion. Even more preferable are the combination of nonionic surfactant (D1) and other emulsification dispersants (D5) and the combination of anionic surfactant (D2) and other emulsification dispersants (D5).

In addition to the resin (a1) and resin (a2), the organic particles (A) in the present embodiment may contain other resin components, initiators (and residues thereof), chain transfer agents, antioxidants, plasticizers, preservatives, reducing agents, organic solvents, and the like.

Examples of other resin components include vinyl resins, polyurethane resins, epoxy resins, polyester resins, polyamide resins, polyimide resins, silicon resins, phenol resins, melamine resins, urea resins, aniline resins, ionomer resins, polycarbonate resins, and the like other than the resins used for the resin (a1) and the resin (a2).

The initiator (and its residue) can be any publicly known radical polymerization initiator and the like. Examples of the publicly known radical polymerization initiators include persulfate initiators such as potassium persulfate, ammonium persulfate, and the like; azo initiators such as azobisisobutyronitrile and the like; organic peroxides such as benzoyl peroxide, cumene hydroperoxide, tertiary butyl hydroperoxide, tertiary butyl peroxy isopropyl monocarbonate, tertiary butyl peroxy benzoate, and the like; and hydrogen peroxide and the like.

Examples of chain transfer agents include n-dodecyl mercaptan, tert-dodecyl mercaptan, n-butyl mercaptan, 2-ethylhexyl thioglycolate, 2-mercaptoethanol, β-mercaptopropionic acid, α-methylstyrene dimer, and the like.

Examples of antioxidants include phenolic compounds, para-phenylenediamine, hydroquinone, organic sulfur compounds, organic phosphorus compounds, and the like.

Examples of phenol compounds include 2,6-di-t-butyl-p-cresol, butylated hydroxyanisole, 2,6-di-t-butyl-4-ethylphenol, stearyl-β-(3,5-di-t-butyl-4-hydroxyphenyl) propionate, 2,2'-methylene-bis-(4-methyl-6-t-butylphenol), 2,2'-methylene-bis-(4-ethyl-6-t-butylphenol), 4,4'-thiobis-(3-methyl-6-t-butylphenol, 4,4'-butylidenebis-(3-methyl-6-t-butylphenol), 1,1,3-tris-(2-methyl-4-hydroxy-5-t-butylphenyl) butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl)propionate]methane, bis[3,3'-bis (4'-hydroxy-3'-t-butylphenyl)butyric acid] cricol ester, tocopherol, and the like.

Examples of paraphenylenediamines includes N-phenyl-N'-isopropyl-p-phenylenediamine, N,N'-di-sec-butyl-p-phenylenediamine, N-phenyl-N-sec-butyl-p-phenylenediamine, N,N'-di-isopropyl-p-phenylenediamine, N,N'-dimethyl-N, N'-di-t-butyl-p-phenylenediamine, and the like.

Examples of hydroquinones include 2,5-di-t-octylhydroquinone, 2,6-didodecylhydroquinone, 2-dodecylhydroquinone, 2-dodecyl-5-chlorohydroquinone, 2-t-octyl-5-methylhydroquinone, 2-(2-octadecenyl)-5-methylhydroquinone, and the like.

Examples of the organosulfur compounds include dilauryl-3,3'-thiodipropionate, distearyl-3,3'-thiodipropionate, ditetradecyl-3,3'-thiodipropionate, and the like.

Examples of the organic phosphorus compounds include triphenylphosphine, tri(nonylphenyl)phosphine, tri(dinonylphenyl)phosphine, tricresylphosphine, tri(2,4-dibutylphenoxy)phosphine, and the like.

Examples of the plasticizers include phthalate esters, aliphatic dibasic acid esters, trimellitic acid esters, phosphoric acid esters, fatty acid esters, and the like.

Examples of the phthalate esters include dibutyl phthalate, dioctyl phthalate, butyl benzyl phthalate, diisodecyl phthalate, and the like.

Examples of aliphatic dibasic acid esters include di-2-ethylhexyl adipate, 2-ethylhexyl sebacate, and the like.

Examples of the trimellitic acid esters include tri-2-ethylhexyl trimellitate, trioctyl trimellitate, and the like.

Examples of the phosphate esters include triethyl phosphate, tri-2-ethylhexyl phosphate, and tri-cresyl phosphate.

Examples of the fatty acid esters include butyl oleate and the like.

Examples of the preservatives include organic nitrogen-sulfur compound preservatives, organic sulfur halide preservatives, and the like.

Examples of the reducing agents include reducing organic compounds such as ascorbic acid, tartaric acid, citric acid, glucose, and formaldehyde sulfoxylate metal salts, and reducing inorganic compounds such as sodium thiosulfate, sodium sulfite, sodium bisulfite, sodium metabisulfite, and the like.

Examples of the organic solvents include ketone solvents [e.g., acetone and methyl ethyl ketone (hereinafter referred to as MEK)], ester solvents (e.g., ethyl acetate and y-butyrolactone), ether solvents (e.g., THF), amide solvents (e.g., N,N dimethylformamide, N,N-dimethylacetamide, N-methyl-2-pyrrolidone, and N-methylcaprolactam), alcohol solvents (e.g. N,N-dimethylformamide, N,N-dimethylacetamide, N-methyl-2-pyrrolidone, and N-methylcaprolactam), alcohol solvents (e.g., isopropyl alcohol), aromatic hydrocarbon solvents (e.g., toluene and xylene), and the like.

[Other Components]

The toner according to one embodiment may contain other components. The other components include, for example, a release agent, a colorant, a charge controlling agent, an external additive agent, a flow improver, a cleaning performance enhancer, a magnetic material, and the like.

(Release Agent)

Release agents are not particularly limited and can be suitably selected from publicly known release agents.

Examples of the release agents such as waxes include natural waxes include plant waxes such as carnauba wax, cotton wax, wood wax rice wax, and the like; animal waxes such as beeswax, lanolin, and the like; mineral waxes such as ozokerite, celsin, and the like; petroleum waxes such as paraffin, microcrystalline, petrolatum, and the like.

In addition to these natural waxes, synthetic hydrocarbon waxes such as Fischer-Tropsch wax, polyethylene, polypropylene, and the like; synthetic waxes such as esters, ketones, ethers, and the like.

In addition, fatty acid amide compounds such as 12-hydroxystearic acid amide, stearic acid amide, phthalic anhydride, chlorinated hydrocarbons, and the like; homopolymers or copolymers of polyacrylates such as poly-n-stearyl methacrylate, poly-n-lauryl methacrylate, and the like which are low molecular weight crystalline polymer resins (e.g., copolymers of n-stearyl acrylate-ethyl methacrylate); and crystalline polymers with long alkyl groups on the side chains may be used.

Among these, hydrocarbon waxes such as paraffin wax, microcrystalline wax, Fischer-Tropsch wax, polyethylene wax, and polypropylene wax are preferably used.

The melting point of the release agent is not particularly limited and can be selected according to the purpose. The melting point of the release agent is preferably 60° C. or higher and 80° C. or lower. When the melting point is 60° C. or higher, the release agent does not easily melt at low temperatures, and heat-resistant-storage property may not be inferior. When the melting point is 80° C. or less, even if the resin melts and is in the fixing temperature range, the release agent sufficiently melts not to cause fixing offset, which avoids having image loss.

The content of the release agent is not particularly limited and can be suitably selected according to the purpose. The content of the release agent is preferably 2 parts by mass to 10 parts by mass and more preferably 3 parts by mass to 8 parts by mass with respect to 100 parts by mass of the toner. If the content is less than 2 parts by mass, high-temperature offset resistance and low-temperature fixing during fixing may be inferior. If the content exceeds 10 parts by mass, the heat-resistant-storage property may be degraded and the image may be prone to fogging. If the content is within the above more preferable range, it is advantageous in terms of improving image quality and fixing stability.

(Colorant)

Specific examples of usable colorants include, but are not limited to, carbon black, Nigrosine dyes, black iron oxide, NAPHTHOL YELLOW S, HANSA YELLOW (10G, 5G and G), Cadmium Yellow, yellow iron oxide, loess, chrome yellow, Titan Yellow, polyazo yellow, Oil Yellow, HANSA YELLOW (GR, A, RN and R), Pigment Yellow L, BENZIDINE YELLOW (G and GR), PERMANENT YELLOW (NCG), VULCAN FAST YELLOW (5G and R), Tartrazine Lake, Quinoline Yellow Lake, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, PERMANENT RED (F2R, F4R, FRL, FRLL and F4RH), Fast Scarlet VD, VULCAN FAST RUBINE B, Brilliant Scarlet G, LITHOL RUBINE GX, Permanent Red F5R, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, and lithopone. These materials can be used alone or in combination.

The content of the colorant is not particularly limited and can be suitably selected according to the purpose. The content of the colorant is preferably from 1 part by mass to 15 parts by mass and more preferably from 3 parts by mass to 10 parts by mass with respect to 100 parts by mass of the toner.

The colorant can be combined with a resin to be used as a master batch. Specific examples of usable resins for producing the master batch or for kneading with the master batch include, but are not limited to, polymers of styrene or its substitutes, such as polystyrene, poly(p-chlorostyrene), poly(vinyltoluene), and the like, as well as polyester resins; styrene polymers such as styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-a-chloromethyl methacrylate copolymer, styrene acrylonitrile copolymer, styrene-vinyl methyl ketone copolymer, styrene-butadiene copolymer, styrene-isoprene copolymer, styrene-acryloyl-indene copolymer, styrene-maleic acid copolymer, styrene-maleic ester copolymer, and the like; polymethyl methacrylate, polybutyl methacrylate, polyvinyl chloride, polyvinyl acetate, polyethylene, polypropylene, polyester, epoxy resin, epoxy polyol resin, polyurethane, polyamide, polyvinyl butyral, polyacrylic acid rosin, modified rosin, terpene resin, aliphatic or alicyclic hydrocarbon resin, aromatic petroleum resin, chlorinated paraffin, paraffin wax, and the like. These materials can be used alone or in combination of two or more materials.

Masterbatches can be obtained by mixing and kneading the resin for the masterbatch with the colorant under high shear. In this process, organic solvents can be used to enhance the interaction between the colorant and the resin. The so-called flushing method, in which a water-based paste containing water from the colorant is mixed and kneaded with the resin and organic solvent to transfer the colorant to the resin side and remove the water and organic solvent components, is also preferably used because the wet cake of the colorant can be used as is and does not need to be dried. This method is also preferable because the wet cake of the colorant can be used as is and does not require drying. High shear dispersion equipment such as a three-roll mill is preferably used for mixing and kneading.

(Charge Controlling Agent)

Charge controlling agents are not particularly limited. Examples of the charge controlling agents include negrosin dyes, triphenylmethane dyes, chromium-containing metal complex dyes, chelate pigments of molybdic acid, Rhodamine dyes, alkoxyamines, quaternary ammonium salts (including fluorine-modified quaternary ammonium salts), alkylamides, phosphor monomer and phosphor-containing compounds, tungsten monomer and tungsten-containing compounds, fluorine activators, metal salts of salicylic acid, metal salts of salicylic acid derivatives, and the like.

Specific examples of commercially available charge controlling agents include, but are not limited to, BONTRON 03 (nigrosine dyes), BONTRON P-51 (quaternary ammonium salt), BONTRON S-34 (metal-containing azo dye), an oxynaphthoic acid metal complex E-82, a salicylic acid metal complex E-84, and a phenolic condensation product E-89, which are manufactured by Orient Chemical Industries Co., Ltd.; the quaternary ammonium salt molybdenum complexes TP-302 and TP-415 (manufactured by Hodogaya Chemical Industry Co., Ltd.), LRA-901, and the boron complex LR-147 (manufactured by Nippon Carlit Co., Ltd.), copper phthalocyanine, perylene, quinacridone, azo pigments, and other polymeric compounds with functional groups such as sulfonic acid groups, carboxyl groups, and quaternary ammonium salts.

The content of the charge controlling agent is not particularly limited and can be suitably selected according to the purpose. The content of the charge controlling agent is preferably 0.1 parts by mass to 10 parts by mass and more preferably 0.2 parts by mass to 5 parts by mass with respect to 100 parts by mass of the toner. If the content of the charge controlling agent exceeds 10 part by mass, the chargeability of the toner becomes too large, it reduces the effect of the main charge controlling agent, and the electrostatic attractive force to the developing roller is increased too much, causing deterioration in the flowability of the developing agent and the image density. These charge controlling agents can be dissolved and dispersed after melt kneading together with the master batch and resin, or of course they can be added when dissolving or dispersing directly in organic solvents, or they can be fixed on the toner surface after the toner particles are prepared.

(External Additive Agent)

In addition to oxide particles, inorganic particles and hydrophobically treated inorganic particles can be used together as external additive agents. The average particle size of hydrophobically treated primary particles is preferably 1 nm to 100 nm, and inorganic particles of 5 nm to 70 nm are more preferably used.

The external additive preferably includes at least one kind of hydrophobized inorganic particle having a primary average particle size of 20 nm or less and at least one kind of hydrophobized inorganic particle having a primary average particle size of 30 nm or more. The external additive preferably has a BET specific surface area of from 20 $m^2/g$ to 500 $m^2/g$.

Specific examples of the external additive agents include, but are not limited to, a silica particle, a hydrophobized silica, a metal salt of a fatty acid (e.g., zinc stearate, aluminum stearate, and the like), a metal oxide (e.g., titania, alumina, tin oxide, antimony oxide, and the like), a fluoropolymer, and the like.

In particular, hydrophobized particles of silica, titania, titanium oxide, and alumina are preferably used as the external additive. Specific examples of the silica particle include, but are not limited to, R972, R974, RX200, RY200, R202, R805, and R812 (available from Nippon Aerosil Co., Ltd.). Specific examples of the titania particle include, but are not limited to, P-25 (available from Nippon Aerosil Co., Ltd.); STT-30 and STT-65C-S (available from Titan Kogyo, Ltd.); TAF-140 (available from Fuji Titanium Industry Co., Ltd.); and MT-150 W, MT-500B, MT-600B, MT-150A (available from Tayca Corporation), and the like.

Specific examples of the hydrophobized titanium oxide particle include, but are not limited to, T-805 (available from Nippon Aerosil Co., Ltd.); STT-30A and STT-65S-S (available from Titan Kogyo, Ltd.); TAF-500T and TAF-1500T (available from Fuji Titanium Industry Co., Ltd.); MT-100S and MT-100T (available from Tayca Corporation); and IT-S (available from Ishihara Sangyo Kaisha, Ltd.).

The hydrophobized oxide particle, hydrophobized silica particle, hydrophobized titania particle, and hydrophobized alumina particle thereof can be obtained by treating hydrophobic particles thereof with a silane coupling agent such as methyl trimethoxysilane, methyl triethoxysilane, and octyl trimethoxysilane. In addition, a silicone-oil-treated oxide or inorganic particle, which is prepared by treating an oxide or inorganic particle with a silicone oil, by application of heat if needed, is also preferable.

Specific examples of the silicone oil include, but are not limited to, dimethyl silicone oil, methyl phenyl silicone oil, chlorophenyl silicone oil, methyl hydrogen silicone oil, alkyl-modified silicone oil, fluorine-modified silicone oil, polyether-modified silicone oil, alcohol-modified silicone oil, amino-modified silicone oil, epoxy-modified silicone oil, epoxy-polyether-modified silicone oil, phenol-modified silicone oil, carboxyl-modified silicone oil, mercapto-modified silicone oil, methacryl-modified silicone oil, a-methyl-styrene-modified silicone oil, and the like.

Specific examples of the inorganic particle include, but are not limited to, silica, alumina, titanium oxide, barium titanate, magnesium titanate, calcium titanate, strontium titanate, iron oxide, copper oxide, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, and silicon nitride. Among these materials, silica and titanium dioxide are preferable.

The content of the external additive agent is not particularly limited and can be suitably selected from the purpose. The content is preferably from 0.1 parts by mass to 5 parts by mass and more preferably 0.3 parts by mass to 3 parts by mass with respect to 100 parts by mass of the toner.

The average diameter of the primary particles of the inorganic particles is not particularly limited and can be suitably selected according to the purpose. The average diameter is preferably 100 nm or less and more preferably 3 nm or more and 70 nm or less. If the average diameter is smaller than this range, the inorganic particles will be embedded in the toner, making it difficult for the particles to function effectively. If the average diameter is larger than this range, the surface of the photoconductor would be unevenly damaged which is undesirable.

(Flow Enhancer)

Flow enhancers are not particularly limited as long as the flow enhancers are capable of performing surface treatment to increase hydrophobicity, and are capable of prevent deterioration in flow and charging characteristics even under high humidity and can be suitably selected according to the purpose. Examples of the flow enhancers include silane coupling agents, silylating agents, silane coupling agents with alkyl fluoride groups, organic titanate coupling agents, aluminum-based coupling agents, silicone oils, modified silicone oils, and the like. Silica and titanium oxide may be surface treated with such flow enhancers, and the surface treated silica and titanium oxide can be particularly preferably used as hydrophobic silica and hydrophobic titanium oxide, respectively.

(Cleaning Performance Enhancer)

Cleaning performance enhancers are not particularly limited as long as the cleaning performance enhancers are added to the toner to remove the post-transfer developing agent remaining on the photoconductor or primary transfer medium and can be suitably selected according to the purpose. Examples of the cleaning performance enhancers include fatty acid metal salts such as zinc stearate, calcium stearate, stearic acid, and the like; polymer particles produced by soap-free emulsion polymerization such as polymethyl methacrylate particles, polystyrene particles, and the like; and the like. The polymer particles preferably have a relatively narrow particle size distribution, and the volume average particle size is suitably 0.01 μm to 1 μm.

(Magnetic Materials)

Magnetic materials are not particularly limited and can be selected according to the purpose. Examples of the magnetic materials include iron powder, magnetite, ferrite, and the like. Among these, white colored magnetic materials are preferably used in terms of color tone.

As described above, the toner of one embodiment contains a plurality of organic particles at least partially embedded in the surface of the toner base particles containing crystalline and amorphous polyester resins. In the toner for one embodiment, the percentage of crystalline polyester resin occupying the surface of the toner base particles is 4% to 20%, the volume average particle size of the organic particles is 10 nm to 40 nm, and the standard deviation of the distance between adjacent particles of organic particles that are not in contact with each other is 500 nm or less. The percentage of crystalline polyester resin occupying the surface of the toner base particles is within the above range, therefore, the toner can enhance low-temperature fixing. In addition, the volume average particle size of the organic particles is within the above range, therefore, the toner can maintain excellent cleaning performance without interfering with low-temperature fixing. Furthermore, the standard deviation of the distance between adjacent particles of organic particles is within the above range, the organic particles can exist scattered on the surface of the toner base particles. As a result, the toner can prevent the low-temperature fixing of the toner from being inhibited by limiting the exposure of the crystalline polyester resin and the like, and can improve the heat-resistant-storage property while ensuring the low-temperature fixing. In addition, during cleaning, free organic particles are easily deposited on the contact surface between the cleaning blade and the photoconductor, and good cleaning performance can be achieved. Furthermore, the content of organic particles released can be kept at an appropriate level, the occurrence of filming can be suppressed.

Therefore, the toner according to one embodiment can have excellent low-temperature fixing, heat-resistant-storage property, cleaning performance, and filming resistance.

In the toner according to one embodiment, the toner base particles contain one or more stitched resins that include a condensation polymerization resin and a styrene resin, two polymerization resin components that have independent reaction paths are partially chemically bonded. At least one of them can contain an amorphous hybrid resin containing a resin component of the same polymerization components as the polyester resin. This allows the crystalline polyester to disperse evenly inside the toner base particles while minimizing its exposure to the surface of the toner base particles. Therefore, the toner of one embodiment can have higher low-temperature fixing and heat-resistant-storage properties.

In the toner according to one embodiment, resin fine particles containing a vinyl group can be used as the organic particles. As a result, the organic particles can be embedded in a state where the particles are surely scattered on the surface of the toner base particles. Therefore, the toner according to one embodiment can further improve the cleaning performance and the heat-resistant-storage property while maintaining the low-temperature fixing.

In the toner according to one embodiment, resin fine particles formed of a styrene acrylic resin having a carboxylic acid can be used as the organic particles. As a result, the organic particles can be embedded in a state where the particles are surely scattered on the surface of the toner base particles. Therefore, the toner according to one embodiment can surely improve the cleaning performance and the heat-resistant-storage property.

The toner according to one embodiment can have the content of organic particles with respect to the toner base particles of 0.2% by mass to 5% by mass. As a result, the toner according to one embodiment can sufficiently obtain the effect of heat-resistant-storage and suppress an increase in inhibition of low-temperature fixing, so that excellent low-temperature fixing and heat-resistant-storage property can be maintained.

In the toner according to one embodiment, the proportion of the crystalline polyester resin occupying the surface of the toner base particles can be 4% to 20%. As a result, the effect of heat-resistant-storage can be sufficiently obtained, and an increase in inhibition of low-temperature fixing can be suppressed. Therefore, the toner according to one embodiment can maintain excellent low-temperature fixing and heat-resistant-storage property.

In the toner according to one embodiment, a glass transition temperature $Tg_{1st}$ in the first temperature rising of the differential scanning calorimetry (DSC) of the toner can be set as 40° C. to 65° C., a glass transition temperature $Tg_{1st}$ in the first temperature rising of the DSC of the insoluble components of the toner in THF can be set as −45° C. to 5° C., and a glass transition temperature $Tg_{2nd}$ in the second temperature rising of DSC of the soluble components of the toner in THF can be set as 20° C. to 65° C. This allows the toner of one embodiment to retain its low-temperature fixing and heat-resistant-storage property, thereby reducing blocking inside the developing device and the occurrence of filming on the photoconductor.

In the toner according to one embodiment, modified polyesters can be included in amorphous polyester resins. This allows the organic particles to be easily embedded in the surface of the toner base particles because the toner base particles have rubber-like properties. Therefore, the toner according to one embodiment can further reduce the content of organic particles released, which can further suppress the occurrence of filling.

The toner in one embodiment can include a trivalent or tetravalent aliphatic polyhydric alcohol component with 3 to 10 carbon atoms in the modified polyester. This allows for the proper generation of amorphous polyester resin within the toner base particles and the proper inclusion of crystalline polyester resin within the toner base particles. Therefore, the toner of one embodiment can exhibit more stable low-temperature fixing, which can increase the gloss and image density of the fixed image.

The toner for one embodiment contains a diol component in the modified polyester, and the carbon number of the diol component, which is the main chain, can be any of 3, 5, 7, and 9, and have an alkyl group in the side chain. This lowers the glass transition temperature Tg of the modified polyester and allows the modified polyester to exhibit the property of deformation at low temperatures. Therefore, the toner of one embodiment can reliably exhibit low-temperature fixing.

Toners according to one embodiment can include at least any of urethane and urea bonds in the modified polyester. This makes the modified polyester more rubber-like property and allows the toner of one embodiment to exhibit excellent heat-resistant-storage property.

<Production Method of Toner>

The methods of producing toners are not particularly limited and can be suitably selected according to the purpose. The method preferably includes a granulation step in which the toner base particles are granulated by dispersing the oil phase, which contains crystalline polyester resin and amorphous polyester resin and, if necessary, release agents, colorants, or the like, in an aqueous medium containing organic particles and an anionic surfactant containing carboxyl groups, as well as attaching the organic particles and the anionic surfactant containing carboxyl groups to the surface of the particles.

In addition, in one embodiment of the method of producing the toner, the granulation step preferably includes an oil phase containing modified polyester, a curing agent, and the like, in addition to the release agent, colorant, and the like, as necessary.

For example, a dissolution-suspension method can be used as a method of producing toner. The method of producing the toner by using the dissolution-suspension method, for example, a method of producing toner base particles while stretching the amorphous polyester resin through an elongation reaction and/or cross-linking reaction between the prepolymer and the curing agent.

The method of producing toner base particles using the dissolution-suspension method includes the following steps: preparing an aqueous medium (aqueous medium preparation step), preparing an oil phase containing the toner material (oil phase preparation step), emulsifying or dispersing the toner material (emulsifying or dispersing step), and removing the organic solvent (organic solvent removal step).

(Preparation Step of Aqueous Medium)

An aqueous medium (aqueous phase), for example, can be prepared by dispersing the resin particles, the organic particles, and the anionic surfactant containing carboxyl group into an aqueous medium. The additive content of the resin particles in the aqueous medium is not particularly limited and can be selected according to the purpose. The additive content of the resin is preferably 0.5 parts by mass to 10 parts by mass with respect to 100 parts by mass of the aqueous medium.

The aqueous medium is not particularly limited, and the aqueous medium can be suitably selected according to the purpose. Examples of the aqueous media include water, solvents miscible with water, mixtures of these, and the like. These may be used alone or in combination with two or more types. Among these, water is preferred.

Solvents miscible with water can be selected according to the purpose, for example, alcohols, lower ketones, dimethylformamide, tetrahydrofuran, cellosolve, and the like. Alcohols are not particularly limited and can be selected as appropriate according to the purpose. Examples of alcohols include methanol, isopropanol, ethylene glycol, and the like. As for lower ketones, lower ketones can be selected as appropriate according to the purpose, for example, acetone, methyl ethyl ketone, and the like.

(Preparation Step of Oil Phase)

The oil phase containing the toner materials includes a crystalline polyester resin, an amorphous crystalline polyester resin having at least one of a urethane bond and a urea bond, and an amorphous crystalline polyester resin without urethane bond and a urea bond. As needed, the oil phase can be prepared by dissolving and dispersing the toner materials containing a curing agent, a release agent, a colorant, and the like into the organic solvent.

The organic solvents are not particularly limited and may be appropriately selected according to the intended purpose. The organic solvents having a boiling point of less than 150° C. is preferably used in that point the organic solvents can be easily removed.

Organic solvents having a boiling point of less than 150° C. are not particularly limited and can be suitably selected according to the purpose. Examples of the organic solvents include toluene, xylene, benzene, carbon tetrachloride, methylene chloride, 1,2-dichloroethane, 1,1,2-trichloroethane, trichlorethylene, chloroform, monochlorobenzene, dichloroethylidene, methyl acetate, ethyl acetate, methyl ethyl ketone, methyl isobutyl ketone, and the like. These can be used only or a combination of two or more organic solvents.

Among these, ethyl acetate, toluene, xylene, benzene, methylene chloride, 1,2-dichloroethane, chloroform, and carbon tetrachloride are preferably used, and ethyl acetate can be more preferably used.

(Emulsification and Dispersion)

The oil phase containing the toner materials is dispersed in the aqueous medium to emulsify or disperse the toner materials therein. The organic particles can be bond to place on the surface of the toner base particles, and the anionic surfactant containing carboxyl groups can be bond to place on the surface of the toner base particles.

In addition, at the time of emulsification or dispersion of the toner materials, an elongation and/or cross-linking reaction of the curing agent and prepolymer to form amorphous polyester resin.

Reaction conditions (for example, reaction time, reaction temperature) for producing the prepolymer are not particularly limited. The conditions can be suitably selected according to the combination of curing agent and prepolymer.

The reaction time is not particularly limited and can be suitably selected according to the purpose. The reaction time is preferably 10 minutes to 40 hours and more preferably 2 to 24 hours.

The reaction temperature is not particularly limited and can be suitably selected according to the purpose. The reaction temperature is preferably 0° C. to 150° C. and more preferably 40° C. to 98° C.

Methods of forming a stable dispersion containing prepolymer in an aqueous medium are not particularly limited and can be suitable selected according to the purpose. For example, the method such that the oil phase prepared by dissolving or dispersing the toner material in a solvent is added to the aqueous medium phase and dispersed by shear force can be used.

Dispersers for dispersing is not particularly limited. Examples of the dispersers include a low-speed shearing disperser, a high-speed shearing disperser, a frictional disperser, a high-pressure jet disperser, an ultrasonic disperser, and the like.

Among these dispersers, a high-speed shearing disperser is preferable because it is capable of adjusting the particle size of the dispersing elements (oil droplets) to 2 μm to 20 μm.

When a high-speed shear disperser is used, the conditions such as rotation speed, dispersing time, and dispersing temperature can be selected according to the purpose.

The number of rotations is not particularly limited and can be selected according to the purpose. The number of rotations is preferably 1,000 rpm to 30,000 rpm and more preferably 5,000 rpm to 20,000 rpm.

The dispersion time is not particularly limited and can be selected according to the purpose. The dispersion time is preferably 0.1 to 5 minutes when a batch method is used.

The dispersion temperature is not particularly limited and can be selected according to the purpose. The dispersion temperature is preferably 0° C. to 150° C. and more preferably 40° C. to 98° C. under a pressure. In general, the higher the dispersion temperature, the easier the dispersion occurs.

The content of aqueous medium used to emulsify or disperse the toner material is not particularly limited and can be selected according to the purpose. The content of aqueous medium is preferably 50 parts by mass to 2000 parts by mass and more preferably 100 parts by mass to 1000 parts by mass with respect to 100 parts by mass of the toner material. If the content of aqueous medium used is less than 50 parts by mass, the toner material may not be dispersed properly, and toner base particles of a predetermined particle size may not be obtained. If the content of aqueous medium used exceeds 2000 parts by mass, the production cost may increase.

When emulsifying or dispersing the oil phase containing the toner material, it is preferable to use a dispersing agent to stabilize the oil droplets and other dispersed materials, to give them the desired shape, and to sharpen the particle size distribution.

Dispersants are not particularly limited and can be selected according to the purpose. Examples of the dispersants include surfactants, inorganic compound dispersants with poor water solubility, polymeric protective colloids, and the like. These may be used alone, or two or more may be used in combination. Among these, surfactants are preferably used.

Surfactants are not particularly limited and can be selected according to the purpose. Examples of the surfactants include anionic surfactants, cationic surfactants, nonionic surfactants, amphoteric surfactants, and the like.

Anionic surfactants are not particularly limited and can be selected according to the purpose. Examples of the anionic surfactants include alkylbenzene sulfonates, α-olefin sulfonates, phosphate esters, and the like. Among these, those with fluoroalkyl groups are preferably used.

(Removal of Organic Solvent)

The toner base particles are obtained by removing the organic solvent from the dispersion medium such as an emulsified slurry and the like. A method of removing the organic solvent from the dispersion medium is not particularly limited and may be appropriately selected according to the intended purpose. Examples of the methods include a method where an entire reaction system is gradually heated to evaporate an organic solvent inside oil droplets, and a method where a dispersion liquid is sprayed in a dry atmosphere to remove an organic solvent inside oil droplets.

Once the organic solvent is removed, toner base particles are formed. Washing, drying, and the like can be performed on the toner base particles, and classification and the like may be further performed. The classification may be performed by removing fine particle components by cyclone, a decanter, or centrifugation in a liquid. Alternatively, an operation of the classification may be performed after drying.

(Cleaning Step)

In the cleaning step, a method of removing a part or all of the resin (a1) includes a method of removing a part or all of (a1) by a chemical method. Among the removal processes by chemical methods, the preferred method is to add an alkaline solution to the toner base particles and mix them to dissolve part or all of the resin (a1).

The alkali in the alkali solution includes alkali metal hydroxides such as potassium hydroxide, sodium hydroxide, and the like or ammonia and the like. From the viewpoint of ease of dissolving the resin (a1), potassium hydroxide and sodium hydroxide are preferably used.

The pH of the alkali in the alkali solution is preferably 8 to 14 and more preferably 10 to 12.

Mixing of the toner base particles and alkaline solution in the cleaning step can be performed by dropping alkaline solution into the toner base slurry during stirring. In addition, an acid solution may be added dropwise to neutralize the particles.

(External Additive Step)

Furthermore, external additive agents, charge controlling agents, and the like can be mixed to the obtained toner base particles. At this time, applying a mechanical impact force can prevent particles such as external additive agents from desorbing from the surface of the toner base particles.

The method of applying mechanical impact force can be selected according to the purpose. For example, the method of applying impact force to the mixture using a vane rotating at high speed, the method of accelerating the mixture by feeding it into a high-speed air stream, and the method of colliding the particles with each other or with a suitable collision plate.

The equipment used for the method of applying mechanical impact force can be selected according to the purpose. Examples of the equipment include Ong Mill (manufactured by Hosokawa Micron Group), I-type mill (manufactured by Nippon Pneumatic Mtg. Co., Ltd.) modified to reduce the grinding air pressure, Hybridization System (manufactured by Nara Machinery Co., Ltd.), Cryptolon System (manufactured by Kawasaki Heavy Industries Ltd.), automatic mortar, and the like.

Subsequently, the resultant is passed through a sieve with a 250-mesh or finer to remove coarse particles and aggregated particles, to thereby obtain the toner according to one embodiment.

<Developing Agent>

The developing agent according to one embodiment may include a toner according to one embodiment and, if necessary, other components selected as appropriate, such as a carrier. Accordingly, the developing agent of one embodiment has excellent transfer properties and chargeability, and can stably form a high-quality image.

The developing agent may be a one-component developing agent or a two-component developing agent. When a high-speed printer designed to handle the recent increase in information processing speed is used, the developing agent is preferably a two-component developing agent because a service life thereof can be improved.

When the toner of one embodiment is used in a one-component developing agent, particle diameters of the toner particles do not largely change even after the toner is consumed and then supplied, the toner filming on a developing roller is suppressed, fusion of the toner to a member, such as a blade for thinning a layer of the toner is suppressed, and excellent and stable developing and images can be obtained even when the developing agent is stirred in a developing device for a long period of time.

When the toner of one embodiment is used in a two-component developing agent, the toner can be mixed with a carrier and used as a developing agent. When the developing agent is used as a two-component developing agent, particle diameters of the toner particles do not largely change even after the toner is consumed and then supplied to the developing device over a long period of time, and excellent and stable developing and images are obtained even when the developing agent is stirred in a developing device for a long period of time.

The content of the carrier in the two-component developing agent can be selected according to the purpose. The content of the carrier is preferably 90 parts by mass to 98 parts by mass, and more preferably 93 parts by mass to 97 parts by mass with respect to 100 parts by mass of the two-component developing agent.

The developing agent according to one embodiment can be suitably used for image formation by various publicly known electrophotographic methods, such as magnetic one-component development methods, non-magnetic single-component development methods, two-component development methods, and the like.

[Carrier]

A carrier is not particularly limited and can be selected according to the purpose. The carrier preferably includes a core material and a resin layer (coating layer) that coats the core material.

(Core Material)

A core material is not particularly limited and can be selected according to the purpose. Examples of the core materials include manganese-strontium materials with 50 emu/g to 90 emu/g, manganese-magnesium materials with 50 emu/g to 90 emu/g. In order to ensure image density, highly magnetized materials such as iron powder of 100 emu/g or higher and magnetite of 75 emu/g to 120 emu/g can be preferably used. Furthermore, the core material is preferably low magnetization material such as copper-zinc of 30 emu/g to 80 emu/g because the impact of the developing agent in which magnet brush rises with respect to the photoconductor can be reduced, and is effective for attaining high-quality images. These may be used alone, or in combination with two or more materials.

The volume average particle size of the core material is not particularly limited and can be selected according to the purpose. The volume average particle size is preferably 10 μm to 150 μm and more preferably 40 μm to 100 μm. If the volume average particle size is 10 μm or more, the problem, such that large content of fine powder is generated in the carrier reduce the magnetization per particle and cause the carrier to scatter, can be effectively prevented. On the other hand, if the volume average particle size is 150 μm or less, the problem, such that the specific surface area is reduced, which can cause toner scattering of poor reproduction of solid areas, especially in full color with many solid areas, can be effectively prevented.

(Resin Layer)

The resin layer can contain resin and other components as necessary. For the resin used in the resin layer, any publicly known material that can provide the necessary chargeability can be used. Specifically, it is preferable to use silicone resin, acrylic resin, or a combination of the two. The composition for forming the resin layer preferably contains a silane coupling agent.

The average thickness of the resin layer is preferably 0.05 μm to 0.50 μm.

<Developing Agent Stored Unit Container>

A developing agent stored unit container according to one embodiment stores the developing agent according to one embodiment. The developing agent stored unit container is not particularly limited, a publicly known container can be suitably selected according to the purpose. The developing agent stored unit container includes a container body, a cap, and the like.

The size, shape, structure, material, or the like of the container body is not particularly limited, but the shape is preferably a cylindrical shape. The container is particularly preferable that the inner circumference of the container has unevenness in a spiral state so that the developing agent which is a content in the container can be transferred to the outlet side by rotating the container, and some or all of the spiral unevenness have a bellows function. Furthermore, the material of the container is not particularly limited, but the material having excellent dimensional accuracy may be preferably used. Examples of the materials include resin materials such as polyester resin, polyethylene resin, polypropylene resin, polystyrene resin, polyvinyl chloride resin, polyacrylic acid, polycarbonate resin, ABS resin, polyacetal resin, and the like.

The developing agent stored unit container is easy to store and transport a developing agent, and is easy to handle. The developing agent stored unit container can be detachably attached to an image forming apparatus, process cartridge, and the like, as described below, and used to replenish the developing agent.

(Toner Stored Unit)

A toner stored unit of the one embodiment is a unit that has a function of storing a toner and stores therein the toner. Examples of embodiments of the toner stored unit include a toner stored container, a developing device, and a process cartridge.

The toner stored container is a container in which a toner is stored.

The developing device is a device including a part configured to store a toner and develop.

The process cartridge is a process cartridge which includes at least an electrostatic latent image carrier (may be also referred to as an image carrier), and a developing part that are integrated, stores therein a toner, and is detachably attached in an image forming apparatus. The process cartridge may further include one selected from an electrostatic charging part, an exposing part, and a cleaning part.

The toner of one embodiment is stored in the toner stored unit of the one embodiment. The toner storage unit of one embodiment is installed in an image forming apparatus to perform an image formation using the toner of one embodiment. Therefore, the toner stored unit according to one embodiment can form images with excellent chargeability, low-temperature fixing, high-temperature offset resistance, and blocking resistance after fixing.

<Image Forming Apparatus>

The image forming apparatus according to one embodiment includes an electrostatic latent image carrying member, an electrostatic latent image forming part configured to form an electrostatic latent image on the electrostatic latent image carrying member, a developing part configured to develop the electrostatic latent image formed in the electrostatic latent image carrying with the toner to form a toner image. The image forming apparatus may further include other parts, as needed.

The image forming apparatus according to one embodiment more preferably includes a transfer part configured to transfer the toner image onto a recording medium, and a fixing part configured to fix a transfer image transferred onto a surface of the recording medium, in addition to the above electrostatic latent image carrying member, electrostatic latent image forming part, and developing part.

In the developing part, the toner according to one embodiment is used. The developing part preferably contains the toner according to one embodiment, and the developing agent containing carrier, other components, or the like can be used to form a toner image, as needed.

(Electrostatic Latent Image Carrier)

A material, shape, structure, size, or the like of the electrostatic latent image carrier (may be referred to as an "electrophotographic photoconductor" or a "photoconductor") are not particularly limited and may be appropriately selected from electrostatic latent image carriers as known in the art. Examples of the materials of the electrostatic latent image carriers include inorganic photoconductors, such as amorphous silicon and selenium, and organic photoconductors (OPC), such as polysilane and phthalopolymethine. Among the above-listed example, amorphous silicon is preferably used from the point of view of long service life.

As an amorphous silicon photoconductor, for example, a photoconductor having a photoconductive layer formed of a-Si can be used by heating a support at 50° C. to 400° C. and depositing a film on the support by a deposition method such as vacuum evaporation, sputtering, ion plating, thermal Chemical Vapor Deposition (CVD), optical CVD, plasma CVD, or the like. Among these, the plasma CVD method, in which the raw material gas is decomposed by direct current, high frequency or microwave glow discharge to form a-Si deposited film on the support, is suitably used.

The shape of the electrostatic latent image carrier is not particularly limited and can be selected according to the purpose, but a cylindrical shape is preferably used. As for the outer diameter of the cylindrical electrostatic latent image carrier, the outer diameter is not particularly limited, and can be selected according to the purpose. The outer diameter is preferably 3 mm to 100 mm, more preferably 5 mm to 50 mm, and particularly preferably 10 mm to 30 mm.

(Electrostatic Latent Image Forming Part)

An electrostatic latent image forming part is not particularly limited and can be selected according to the purpose, as long as the electrostatic latent image forming part is configured to form an electrostatic latent image on the electrostatic latent image carrier. For example, the electrostatic latent image forming part includes one of an electrostatic charging part (an electrostatic charger) configured to uniformly charge a surface of the electrostatic latent image carrier and an exposing part (an exposure) configured to expose the surface of the electrostatic latent image bearer imagewise.

The electrostatic charger is not particularly limited and may be appropriately selected according to the intended purpose. Examples of the electrostatic charger include contact-type electrostatic chargers, as known in the art, each equipped with a conductive or semiconductive roller, brush, film, or rubber blade, and non-contact type electrostatic chargers utilizing corona discharge, such as corotron, scorotron, and the like.

The shape of the electrostatic charger can take any form, such as a magnetic brush or a fur brush, in addition to a roller and can be selected according to the specifications and form of the image forming equipment.

The electrostatic charger is preferably an electrostatic charger that is disposed in contact with or without contact with the electrostatic latent image carrier and is configured to apply superimposed DC and AC voltage to charge a surface of the electrostatic latent image carrier. Moreover, the electrostatic charger is preferably an electrostatic charger that is disposed close to the electrostatic latent image carrier via a gap tape without contacting with the electrostatic latent image carrier, and is configured to apply superimposed DC and AC voltage to the charging roller to charge a surface of the electrostatic latent image carrier.

Although the electrostatic charger is not limited to a contact-type charger, a contact-type charging member is preferably used from the viewpoint of obtaining an image forming apparatus with reduced ozone generated by the electrostatic charger.

The exposing part is not particularly limited and may be appropriately selected according to the intended purpose, as long as the exposure can expose the surface of the electrostatic latent image carrier charged by the charger to the image to be formed. Examples of the exposure include various exposing parts, such as a copy optical exposing part, a rod lens array exposing part, a laser optical exposing part, a liquid crystal shutter optical exposing part, and the like.

A light source to be used for the exposing part is not particularly limited and can be appropriately selected according to the intended purpose. Examples of the light sources include light-emitting materials in general such as fluorescent lamps, tungsten lamps, halogen lamps, mercury lamps, sodium lamps, light-emitting diodes (LED), semiconductor lasers (LD), electroluminescence (EL) light source, and the like.

Various filters such as sharp-cut filters, band-pass filters, near-infrared cut filters, dichroic filters, interference filters, and color temperature conversion filters can also be used to transmit only light in the desired wavelength range.

Note that, a back-exposure system where imagewise exposure is performed from the back side of the electrostatic latent image carrier may be employed.

(Developing Part)

The developing part is not particularly limited as long as the developing part can develop the electrostatic latent image formed on the electrostatic latent image carrier to form a visible image, and the developing part can be suitably selected according to the purpose. The developing part, for example, can be suitably equipped with a developing device that contains toner and can apply the toner to the electrostatic latent image in a contact or non-contact manner, and the developing device equipped with a toner container is preferably used.

The developing device can be a monochrome developing device or a multicolor developing device. As a developing device, for example, it is preferable to use a developing device with an agitator that charges the toner by frictional agitation and a magnetic field generator fixed inside, and a developing agent carrier that can rotate carrying a developing agent containing toner on its surface.

(Transfer Part)

The transfer part preferably includes a primary transfer part that transfers the visible image onto the intermediate transfer body to form a composite transfer image, and a secondary transfer part that transfers the composite transfer image onto the recording medium. The intermediate transfer body is not particularly limited and can be selected from among publicly known transfer bodies according to the purpose; for example, a transfer belt is suitably used.

The transfer part (primary transfer methods and secondary transfer part) preferably has at least a transfer part that peels and charges the visible image formed on the electrostatic latent image carrier (photoconductor) to the recording medium side. The transfer part may be one or two or more.

The transfer devices include corona transfer devices by corona discharge, transfer belts, transfer rollers, pressure transfer rollers, adhesive transfer devices, and the like.

Although plain paper is the typical recording medium, there are no particular limitations, and the recording medium can be selected according to the purpose, as long as the unfixed image after development can be transferred. PET base for OHP can also be used.

(Fixing Part)

The fixing part is not particularly limited and can be selected according to the purpose, but publicly known heating and pressurizing part is suitably used. Examples of the heating and pressurizing part include a combination of a heating roller and a pressurizing roller, a combination of a heating roller, a pressurizing roller, and an endless belt.

The fixing part has a heating body provided with a heating element, a film in contact with the heating body, and a pressure member that is in pressure contact with the heating body via the film, and an unfixed image is formed between the film and the pressure member. The heating and pressurizing part can be heated and fixed by passing through the formed recording medium.

The heating in the heating and pressurizing part is usually preferably 80° C. to 200° C.

The surface pressure in the heating and pressurizing part is not particularly limited and may be appropriately selected according to the intended purpose, but is preferably 10 $N/cm^2$ to 80 $N/cm^2$.

In the present embodiment, for example, a known optical fixing device may be used together with publicly or in place of the fixing part, according to the purpose.
(Other)

The image forming apparatus according to the primary form may also include, for example, a static elimination part, a recycling part, a control part, and the like.
(Static Elimination Part)

The static elimination part is not particularly limited as long as the static elimination part can apply a static eliminator bias to the electrostatic latent image carrier and can be appropriately selected from publicly known static eliminators. For example, a static eliminator lamp or the like is preferably used.
(Cleaning Part)

The cleaning part only needs to be able to remove the toner remaining on the electrostatic latent image carrier, and can be appropriately selected from publicly known cleaners. Examples of the cleaning part include a magnetic brush cleaner, an electrostatic brush cleaner, a magnetic roller cleaner, a blade cleaner, a brush cleaner, a web cleaner, and the like.

The image forming apparatus according to the primary form can improve the cleaning property by having a cleaning part. That is, by controlling the adhesive force between the toners, the fluidity of the toner can be controlled and the cleaning performance can be improved. Further, by controlling the characteristics of the deteriorated toner, excellent cleaning quality can be maintained even under harsh conditions such as long-life usage and high-temperature and humidity. Further, the external additive agent can be sufficiently released from the toner on the photoconductor, high cleaning performance can be achieved by forming a deposited layer (dam layer) of the external additive agent in the cleaning blade nip portion.
(Recycle Part)

The recycling part is not particularly limited, and examples thereof include publicly known transportation methods.
(Control Part)

The control part can control the movement of each of the above parts. The control part is not particularly limited as long as the control part can control the movement of each of the above parts, and can be appropriately selected according to the intended purpose. Examples thereof include control devices such as sequencers, computers, and the like.

The image forming apparatus according to one embodiment can form an image using the toner according to one embodiment. Therefore, the image which is excellent in chargeability, low-temperature fixing property, high-temperature offset resistance, and blocking resistance after fixing can be provided.
<Method of Forming Images>

The method of forming images according to one embodiment includes an electrostatic latent image forming step to form an electrostatic latent image on the electrostatic latent image carrier, a development step in which the electrostatic latent image is developed using toner to form a toner image, and other steps, as needed. The method of forming images can be suitably performed by the image forming apparatus, the electrostatic latent image forming step can be suitably performed by the electrostatic latent image forming part, the developing step can be suitably performed by the developing part, and the other steps can be suitably performed by the other parts.

Furthermore, the method of forming images according to one embodiment preferably include a transfer step that transfers the toner image to the recording medium, and a fixing step that fixes the transferred image on the surface of the recording medium.

In the developing step, the toner of one embodiment is used. A toner preferably includes the toner according to one embodiment, further may include a developing agent containing other components such as a carrier and the like to form a toner image.

The electrostatic latent image formation step forms an electrostatic latent image on the electrostatic latent image carrier, and includes a charging step to charge the surface of the electrostatic latent image carrier, and an exposure step to expose the charged surface of the electrostatic latent image carrier to form an electrostatic latent image. Charging can be performed, for example, by applying a voltage to the surface of the electrostatic latent image carrier using a charger. The exposure can be performed, for example, by exposing the surface of the electrostatic latent image carrier in an image-like manner using an exposure device. The formation of an electrostatic latent image can be performed, for example, by uniformly charging the surface of the electrostatic latent image carrier and then exposing it to the image, which can be performed by the electrostatic latent image forming part.

The developing step is a step to form a visible image by sequentially developing an electrostatic latent image with toners of multiple colors. The formation of the visible image can be performed, for example, by developing the electrostatic latent image with toner, which can be performed by a developing device.

In the developing device, for example, toner and carrier are mixed and agitated, and the toner is charged by the friction during the mixing and agitation, and is held on the surface of the rotating magnetic roller in a raised state to form a magnetic brush. The magnetic roller is provided near the electrostatic latent image carrier (photoconductor), some of the toner that makes up the magnetic brush formed on the surface of the magnetic roller moves to the surface of the electrostatic latent image carrier (photoconductor) by electrical attraction. As a result, the electrostatic latent image is developed by the toner and a visible image made by the toner is formed on the surface of the electrostatic latent image carrier (photoconductor).

The transfer step is the step of transferring the visible image to the recording medium. The transfer step preferably uses an intermediate transfer body, and after primary transfer of the visible image onto the intermediate transfer body, secondary transfer of the visible image onto the recording medium is performed. Two or more toners, preferably full color toners are preferable used for the transfer step. The transfer step includes a primary transfer step to transfer the visible image onto the intermediate transfer body to form a composite transfer image, and a secondary transfer step to transfer the composite transfer image onto the recording medium. Transfer can be performed, for example, by charging the electrostatic latent image carrier (photoconductor) with a transfer charger for the visible image, and can be performed by the transfer part.

The fixing step is a step of fixing the visible image transferred to the recording medium using a fixing device, and may be performed for each color developing agent for each transfer to the recording medium, or simultaneously for each color developing agent at one time in a stacked state.

The method of forming images according to the primary form may further include other processes selected as necessary, such as static elimination step, cleaning step, recycling processes, and the like.

The static elimination step is a step of applying a static elimination bias to the electrostatic latent image carrier to eliminate static, and can be performed suitably by the static elimination part.

The cleaning step removes the residual toner on the electrostatic latent image carrier, and can be suitably performed by the cleaning part.

The recycling step is a step to recycle the toner removed by the cleaning step into the developing part, and can be performed suitably by the recycling part.

The method of forming images of one embodiment can provide images with excellent chargeability, low-temperature fixing, high-temperature offset resistance, and blocking resistance after fixing, because the toner of one embodiment can be used for image formation.

[One Embodiment of Image Forming Apparatus]

Figure 2:
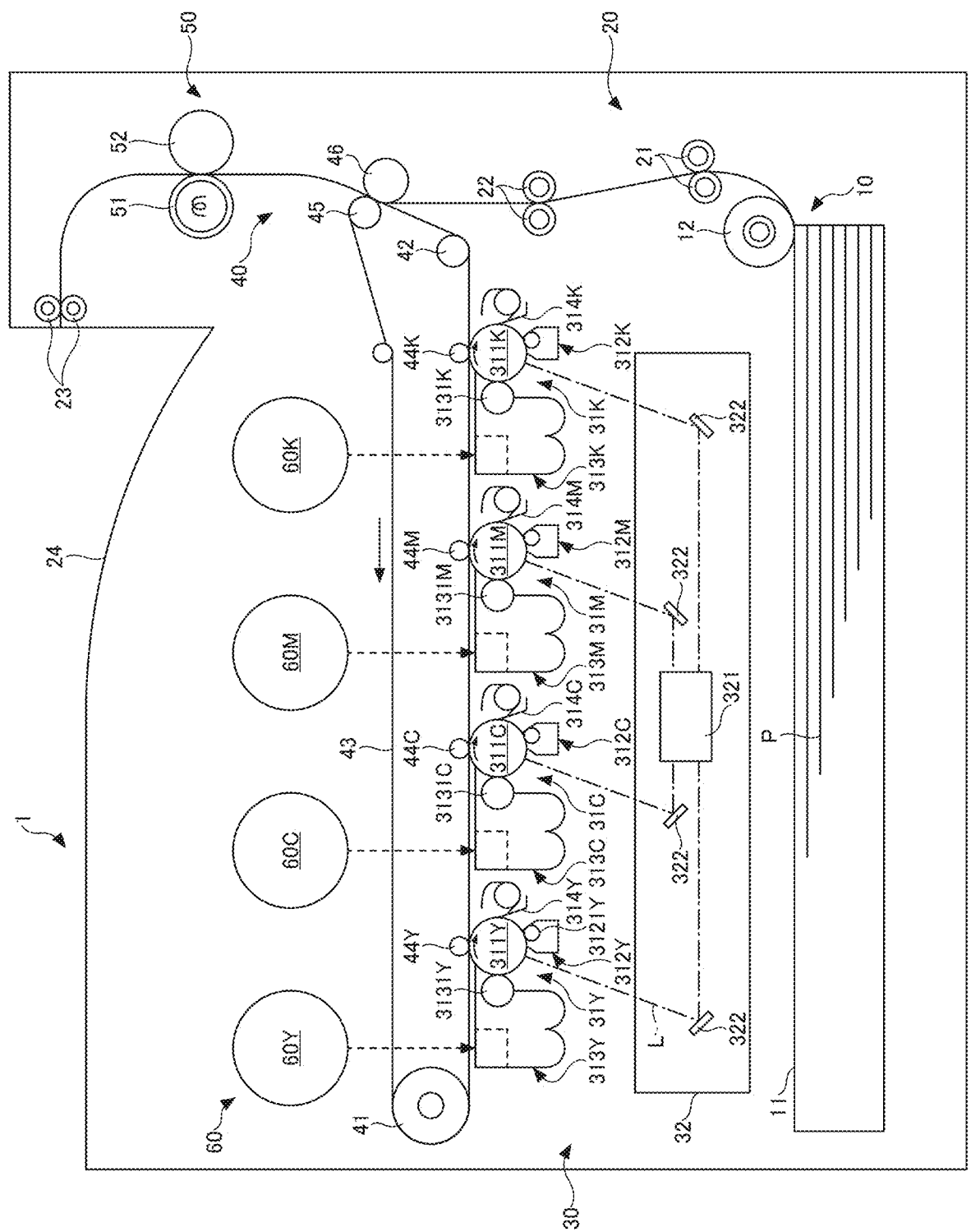
FIG. 2 is a schematic diagram of an example of an image forming apparatus according to one embodiment.

One type of image forming apparatus according to one embodiment is described with reference to FIG. 2. The image forming apparatus is not particularly limited to any device that forms images using toner, such as a printer, copier, facsimile machine, multifunction machine, and the like. In FIG. 2, the case when the image forming apparatus of the present embodiment is a printer is explained as an example.

FIG. 2 is a schematic diagram of an example of an image forming apparatus according to one embodiment. As illustrated in FIG. 2, an image forming apparatus of electrophotographic imaging device (printer) 1 is equipped with a paper sheet feeding part 10, a conveying part 20, an imaging forming part 30, a transfer part 40, a fixing part 50, and a toner cartridge 60.

The paper sheet feeding part 10 is equipped with a paper sheet feeding cassette 11 loaded with paper P to be fed, and a paper sheet feeding roller 12 that feeds the paper P loaded in the paper sheet feeding cassette 11 per one sheet at a time.

The paper sheet feeding cassette 11 is located below the exposure device 32. Each paper feeding cassette 11 contains a plurality of sheets of transfer paper P, which is a recording medium, in a stacked paper bundle.

The paper sheet feeding roller 12 is positioned so that the paper sheet feeding roller 12 contacts the topmost transfer paper P in the paper sheet feeding cassette 11.

In the paper sheet feeding part 10, when the paper sheet feeding roller 12 is rotatably driven by the driving member in a counterclockwise direction in the figure, the topmost transfer paper P in the paper sheet feeding cassette 11 is ejected from the right side of the paper sheet feeding cassette 11 in FIG. 2 toward the conveying part 20. The ejected transfer paper P is transported from the lower side to the upper side in FIG. 2 while being pinched between the rollers of the conveying rollers 21.

The conveying part 20 includes conveying rollers 21 that transports the transfer paper P fed by the paper sheet feeding roller 12 in the direction of the transfer part 40; a pair of timing rollers 22 that stand by holding the tip of the transfer paper P transported by the conveying rollers 21, and feed the paper to the transfer part 40 at a predetermined timing; paper ejecting rollers 23 that ejected paper P with the color toner image fixed to a paper ejecting tray 24; a paper ejecting tray 124 where the paper P ejected from the paper ejecting rollers 23 is counted.

The conveying rollers 21 are arranged to pinch the transfer paper P and transport it from the lower side to the upper side in FIG. 2.

The timing rollers 22 are disposed at the downstream end of the conveying rollers 21 in the conveyance direction. The timing rollers 22 momentarily cease the rotation of both rollers as soon as the transfer paper P being fed from the conveying rollers 21 is caught between the rollers. The timing roller 22 then feeds the transfer paper P sandwiched between the rollers toward the secondary transfer nip at a timing that can be synchronized with the four-color toner image on the intermediate transfer belt 43.

Paper ejecting rollers 23 are rollers that eject the transfer paper P that has undergone the fixing process to the outside of the printer 100.

The paper ejecting tray 24 is provided on the upper surface of the main body of the printer 100 and stacks the transfer paper P that has been ejected outside the printer 100 by the paper ejecting roller 23.

The image forming part 30 is equipped with four image forming parts for yellow, magenta, cyan, and black (hereinafter referred to as Y, C, M, and K, respectively), namely image forming parts 31Y, 31C, 31M, and 31K, and a latent image forming part, namely an exposure device 32.

The imaging forming parts 31Y, 31C, 31M and 31K are arranged in order from left to right in the figure with predetermined intervals, and are lined up to face the intermediate transfer belt 141. The developing units 31Y, 31C, 31M and 31K form images using a developing agent having Y toner, C toner, M toner, and K toner, respectively. The image forming units 31Y, 31C, 31M and 31K form an image using a developing agent having Y toner, C toner, M toner, and K toner, respectively. The developing agent has a toner and a carrier. The four image-forming units 31Y, 31C, 31M, and 31K have different types of developing agents.

The configurations of the image forming units 31Y, 31C, 31M, and 31K will be described. The image forming units 31Y, 31C, 31M, and 31K are the same except that the toner colors are different. Therefore, only the configuration of the image forming unit 31Y will be described, and the description of the configuration of the other image forming units 31C, 31M, and 31K will be omitted.

The imaging unit 31Y includes a drum-shaped photoconductor 311Y, an electrostatic charger 312Y, a developing device 313Y, a photoconductor cleaning device 314, components such as a lubricant application device, a cleaning roller, a static elimination lamp, and the like (none of which are shown), incorporated in a single unit as a process cartridge, which can be attached to and detached from the imaging system 1. The process cartridge is removable from the image forming apparatus 1. The photoconductor 11Y is surrounded by a photoconductor 311Y, an electrostatic charger 312Y, a developing device 313Y, a photoconductor cleaning device 314, components such as a lubricant application device, a cleaning roller, and a static elimination lamp (none of which are shown).

The photoconductor 311Y is shown in the shape of a drum, but the shape can also be a sheet or endless belt.

As the electrostatic charger 312Y, a publicly known configuration such as a corotron, scorotron, solid state electrostatic charger, and the like can be used. Among these electrostatic chargers, the chargers with contact electrostatic charging type and the non-contact proximity arrangement type are more desirable, and have advantages such as higher charging efficiency, less ozone generation, and the possibility of downsizing the device. In the present embodiment, the electrostatic charger 312Y is equipped with an electrostatic charging roller 3121Y, which is an electrostatic charging member, and uses a non-contact proximity arrangement type in which the electrostatic charging roller 3121Y is placed close to the photoconductor 311Y. The electrostatic charging roller 3121Y is located at a predetermined distance from the photoconductor 311Y so as to be in a non-contact arrangement with respect to the photoconductor 311Y, and charges the photoconductor 311Y to a predetermined polarity and a predetermined potential. The surface of the photoconductor 311Y, uniformly charged by the electrostatic charging roller 3121Y, is irradiated with laser light L based on image information from the exposure device 32 to form an electrostatic latent image.

The developing unit 313Y converts the latent image formed on the surface of the photoconductor 311Y into a toner image. The developing unit 313Y has a developing roller 3131Y as a developing agent carrier. A developing bias is applied to the developing roller 3131Y from the power supply.

In the developing unit 313Y, the toner in the developing agent is charged to a predetermined polarity. The developing agent is then pumped onto the surface of the developing roller 3131Y, and the toner of the pumped developing agent attaches to the latent image on the photoconductor 311Y in the developing area facing the photoconductor 311Y.

The photoconductor cleaning device 314 cleans the residual toner on the photoconductor 311Y after the toner image is transferred to the intermediate transfer belt 43 provided by the transfer part 40. The photoconductor cleaning device 314Y may have a fur brush, a cleaning blade, or the like.

The lubricant application device (not shown) applies lubricant on the surface of the photoconductor 311Y after the photoconductor 311Y has been cleaned by the photoconductor cleaning device 314Y.

The cleaning roller (not shown) cleans the electrostatic charging roller 3121Y.

A static elimination lamp (not shown) eliminates the surface potential of the photoconductor 311Y after cleaning.

The exposure device 32 is located below the image forming part 11. The photoconductors 311Y, 311C, 311M, and 311K are irradiated with laser light L that is emitted, based on the image information, by the exposure device 32. As a result, electrostatic latent images for Y, C, M, and K are formed on the photoconductors 311Y, 311C, 311M, and 311K.

The exposure device 32 is equipped with a polygon mirror 321 that is driven by a motor to rotate the laser light L emitted from the light source. The exposure device 32 deflects the laser light L by the polygon mirror 321 and transmits it onto the photoconductors 311Y, 311C, 311M, and 311K through a plurality of optical lenses and mirrors. Instead of this configuration, the exposure device 32 may be equipped with an LED array for optical scanning.

The light source of the laser light L and the static elimination lamp of the exposure device 32 can be a fluorescent lamp, tungsten lamp, halogen lamp, mercury lamp, sodium lamp, light emitting diode (LED), semiconductor laser (LD), electroluminescence (EL), or any other light emitting material in general.

Various filters such as sharp-cut filters, band-pass filters, near-infrared cut filters, dichroic filters, interference filters, and color temperature conversion filters can also be used to transmit only light in the desired wavelength range.

Among these light sources, light emitting diodes and semiconductor lasers are well used because of their high emission energy and long wavelength light of 600 nm to 800 nm.

The transfer part 40 is located above the four images forming units 1Y, 1C, 1M, and 1K. The transfer part 40 includes a drive roller 41 and a follower roller 42, an intermediate transfer belt 43, which is an intermediate transfer body that can rotate counterclockwise in the figure as the drive roller 41 is driven, primary transfer rollers 44Y, 44C, 44M, and 44K, which are provided across the intermediate transfer belt 43 and face photoconductors 311Y, 311C, 311M, and 311K, a secondary facing roller 45 and a secondary transfer roller 46, which are provided across the intermediate transfer belt 43 at the transfer position of the toner image onto the paper. The transfer part 40 superimposes and transfers the toner images of each color formed on the surfaces of the photoconductors 311Y, 311C, 311M, and 311K on the surface of the intermediate transfer belt 43.

The drive roller 41 is a roller that rotationally drives the intermediate transfer belt 43.

The follower roller 42 is arranged inside the intermediate transfer belt 43 and is a roller for endlessly moving the intermediate transfer belt 43.

The intermediate transfer belt 43 is an endless belt stretched by seven rollers arranged inside, and is designed to be endlessly movable in the arrow direction by the rotational drive of the drive roller 41.

The primary transfer rollers 44Y, 44C, 44M, and 44K are primary transfer members included in the primary transfer device, which is a primary transfer part that transfers toner images on the surfaces of the photoconductors 311Y, 311C, 311M, and 311K to the intermediate transfer belt 43. The primary transfer rollers 44Y, 44C, 44M, and 44K sandwich the intermediate transfer belt 43 between the photoconductors 311Y, 311C, 311M, and 311K to form the primary transfer nip, respectively. The primary transfer rollers 44Y, 44C, 44M, and 44K then apply a transfer bias of the opposite polarity (for example, positive) to the back surface (inner loop surface) of the intermediate transfer belt 43 from that of the toner. In the process of sequentially passing through the primary transfer nips for Y, C, M, and K as the intermediate transfer belt 43 endlessly moves, the Y, C, M, and K toner images on the photoconductors 311Y, 311C, 311M, and 311K are superimposed on the surface of the intermediate transfer belt 43 for primary transfer. This forms a four-color superimposed toner image (hereinafter referred to as four-color toner image) on the intermediate transfer belt 43.

The secondary facing roller 45 sandwiches the intermediate transfer belt 43 between the secondary facing roller 45 and the secondary transfer roller 46, in which the secondary roller is located outside the loop of the intermediate transfer belt 43, to form a secondary transfer nip.

In the secondary transfer roller 46, a secondary transfer bias is applied to the secondary transfer roller.

The secondary transfer roller 46 is a secondary transfer member that transfers the four-color toner image on the intermediate transfer belt 43 to the transfer paper P in a batch. The four-color toner image on the intermediate transfer belt 43 is collectively secondary transferred to the transfer paper P in the secondary transfer nip due to the secondary transfer electric field and nip pressure formed between the secondary transfer roller 46 and the secondary facing roller 45. This results in a color toner image.

After passing through the secondary transfer nip, the intermediate transfer belt 43 is covered with transfer residue toner that has not been transferred to the transfer paper P. The transfer residual toner is cleaned by the belt cleaning part (not shown).

When forming monochrome images, the printer 100 rotates the primary transfer rollers 44Y, 44C, 44M, and 44K for Y, C, and M counterclockwise in the figure around the rotation axis of the follower roller 42 to separate the intermediate transfer belt 21 from the photoconductors 311Y, 311C, and 311M for Y, C, and M. Then, of the four imaging units 31Y, 31C, 31M, and 31K, only the image forming unit 31K for K is driven to form a monochrome image. With this, wear and tear of each component of the image forming unit due to unnecessary driving of the image forming units 31Y, 31C and 31M during monochrome image formation can be avoided.

The fixing part 50 is located above the secondary transfer nip in the figure. The fixing part 50 is equipped with a fixing belt part 51 that contains a heat source such as a halogen lamp and the like and heats the transfer paper P, and a pressure roller 52 that forms a fixing nip that contacts the fixing belt 621 by rotatably applying pressure to the fixing belt part 51.

The transfer paper P that has passed through the secondary transfer nip described above is separated from the intermediate transfer belt 43 and then sent into the fixing part 50. In the process of being conveyed from the lower side to the upper side in the figure while being sandwiched between the fixing nips in the fixing part 50, the color toner image is fixed to the transfer paper P by being heated and pressed by the fixing belt part 51, which applies heat and pressure to the color toner image on the transfer paper P. The color toner image is then fixed to the transfer paper P.

The transfer paper P, which has undergone the fixing process in this way, is ejected into the paper ejecting tray 24 after passing between the rollers of the paper ejecting rollers 23. This completes the series of image forming processes.

The toner cartridges 60 are located above the transfer part 40 and include toner cartridges 60Y, 60C, 60M, and 60K. Toner cartridges 60Y, 60C, 60M, and 60K contain Y, C, M, and K toner, respectively. The Y, C, M, and K toners in the toner cartridges 60Y, 60C, 60M, and 60K are supplied to the developing devices 313Y, 313C, 313M, and 313K of the image forming units 31Y, 31C, 31M, and 31K as appropriate. These toner cartridges 60Y, 60C, 60M, and 60K can be detached and attached to the printer main body independently of the image forming units 31Y, 31C, 31M, and 31K.

<Process Cartridge>

A process cartridge of one embodiment is molded to be detached and attached to various imaging devices, and has an electrostatic latent image carrier that carries an electrostatic latent image, a developing part that develops the electrostatic latent image carried on the electrostatic latent image carrier with the developing agent of one embodiment above to form a toner image, and may have other configurations as necessary.

The electrostatic latent image carrier is the same as the electrostatic latent image carrier of the image forming apparatus described above. Therefore, the details are omitted.

The developing part includes a developing agent container that contains a developing agent according to one embodiment, and a developing agent carrier that carries and conveys the developing agent contained in the developing agent container. The developing part may further have a regulating member or the like to regulate the thickness of the developing agent to be carried.

Figure 3:
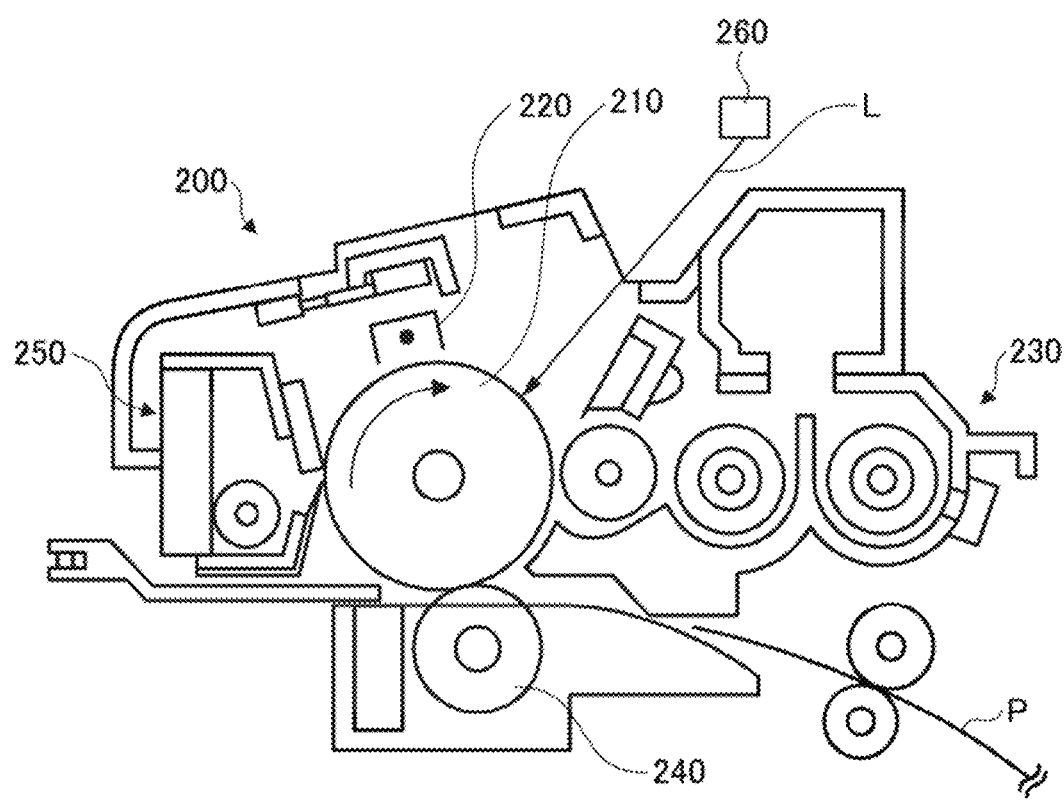
FIG. 3 is a schematic diagram illustrating an example of a process cartridge according to one embodiment.

FIG. 3 illustrates an example of a process cartridge of one embodiment. As illustrated in FIG. 3, the process cartridge 200 includes a photoconductor drum 210, a corona charger 220, a developing device 230, a transfer roller 240, and a cleaning device 250. An exposure device 260 is installed above the process cartridge 200. Each of these components of the process cartridge 200 is similar to the photoconductors 311Y, 311C, 311M, and 311K, the electrostatic charger 312Y, 312C, 312M, and 312K, the developing device 313Y, 313C, 313M, and 313K, the photoconductor cleaning device 314, 314C, 314M, and 314K, and primary transfer rollers 44Y, 44C, 44M, and 44K that are illustrated in FIG. 2. Therefore, the details are omitted.

In the process cartridge 200, the surface of the photoconductor drum 210 is uniformly charged using the corona charger 220. After the surface of the photoconductor drum 210 is uniformly charged, the exposure light L is exposed to the photoconductor drum 210 using the exposure device 260 to form an electrostatic latent image. The electrostatic latent image formed on the photoconductor drum 10 is then developed with toner supplied from the developing device 230 to form a toner image. The toner image formed on the photoconductor drum 210 is then transferred to the transfer paper P conveyed by the rollers by the transfer bias applied from the transfer roller 240.

EXAMPLES

The following Examples and Comparative Examples are provided to explain the embodiments in more detail, but the embodiments are not limited by these Examples and Comparative Examples.

<Synthesis of Amorphous Polyester Resin>

Bisphenol A ethylene oxide with 2 mole additive, bisphenol A propylene oxide with 3 mole additive, terephthalic acid, adipic acid, and trimethylolpropane were prepared in a four-necked flask equipped with a nitrogen inlet tube, dehydration tube, stirrer, and heat exchanger. In this case, the molar ratio of bisphenol A ethylene oxide with 2 mole additive and bisphenol A propylene oxide with 3 mole additive (bisphenol A ethylene oxide with 2 mole additive/bisphenol A propylene oxide with 3 mole additive) is 85/15, the molar ratio of terephthalic acid and adipic acid in a molar ratio (terephthalic acid/adipic acid) of 75/25, the content of trimethylolpropane in all monomers was 1% by mol, and the molar ratio of hydroxyl groups to carboxyl groups, OH/COOH, was 1.2. The mixture of each component prepared in the four-necked flask was then reacted with titanium tetraisopropoxide (500 ppm relative to the resin component) for 8 hours at 230° C. at room pressure, followed by another 4 hours at a reduced pressure of 10 mmHg to 15 mmHg. Then, trimellitic anhydride was added to the reaction vessel to prepare 1% by mol of the total resin component, and the reaction was carried out at 180° C. and ambient pressure for 3 hours. As a result, amorphous polyester resin 1 was obtained.

<Preparation of Crystalline Polyester Resin Dispersion>

[Synthesis of Crystalline Polyester Resin]

Sebacic acid and 1,6-hexanediol were prepared in a 5 L four-necked flask equipped with a nitrogen inlet tube, a dehydration tube, a stirrer, and a thermocouple so that the molar ratio of the hydroxyl group to the carboxyl group, OH/COOH, was 0.9. The mixture of each component prepared in the four-necked flask was then reacted with titanium tetraisopropoxide (500 ppm with respect to the resin component) at 180° C. for 10 hours. The temperature of the mixture was then raised to 200° C. and reacted for 3 hours, and further reacted at a pressure of 8.3 kPa for 2 hours. As a result, crystalline polyester resin 1 was obtained.

[Preparation of Crystalline Polyester Dispersion]

60 parts by mass of crystalline polyester resin 1 and 400 parts by mass of ethyl acetate were prepared in a container equipped with a stirring rod and a thermometer, and the temperature was raised to 80° C. with stirring and maintained at 80° C. for 5 hours. After that, the mixed liquid in the container was cooled to 30° C. in 1 hour, and dispersion was carried out using a bead mill (Ultra viscomill, manufactured by Imex) with a feed rate of 1 kg/hr, a disc peripheral speed of 6 m/sec to fill zirconia beads with a diameter of 0.5 mm for 80% by volume, under the condition of three passes. As a result, crystalline polyester resin dispersion 1 was obtained.

<Synthesis of Prepolymer>

3-methyl-1,5-pentanediol, isophthalic acid, adipic acid, and trimellitic anhydride were added to a reaction vessel equipped with a cooling tube, a stirrer, and a nitric acid introduction tube, together with titanium tetraisopropoxide (1,000 ppm with respect to the resin component). The molar ratio of hydroxyl group to carboxyl group, OH/COOH, was 1.5, the composition of the diol component was 100% by mol of 3-methyl-1,5-pentanediol, and the composition of the dicarboxylic acid component was 40% by mol of isophthalic acid and 60% by mol of adipic acid. The composition of the dicarboxylic acid component was 40% by mol of isophthalic acid and 60% by mol of adipic acid, and the content of trimellitic anhydride in the total monomer was 1 mol %. The temperature of the mixture was then raised to 200° C. in about 4 hours, and then raised to 230° C. over 2 hours, and the reaction was carried out until no effluent was observed. After that, the reaction was further carried out under reduced pressure of 10 mmHg to 15 mmHg for 5 hours. The intermediate polyester 1 was thereby obtained.

Next, the intermediate polyester 1 and isophorone diisocyanate (IPDI) were put into a reaction vessel equipped with a cooling tube, stirrer, and nitrogen inlet tube at a molar ratio (isocyanate group of IPDI/hydroxyl group of intermediate polyester) of 2.0, and diluted with ethyl acetate to become a 50% of ethyl acetate solution. The mixture was then reacted at 100° C. for 5 hours to obtain prepolymer 1.

<Synthesis of Hybrid Resin>

In a 5 L four-necked flask equipped with a nitrogen inlet tube, dehydration tube, stirrer, and heat exchanger, 7.2 g of 2,3-butanediol, 6.08 g of 1,2-propanediol, 18.59 g of terephthalic acid, and 0.18 g of tin(II) 2-ethylhexanoate were added. After that, nitrogen gas was introduced into the vessel to maintain an inert atmosphere, and the temperature was raised, and then kept at 180° C. for 1 hour. After that, the temperature was raised from 180° C. to 230° C. at 10° C./hr, and then the condensation polymerization reaction was carried out at 230° C. for 10 hours. The reaction was then further carried out at 230° C. and 8.0 kPa for 1 hour. After cooling to 160° C., 0.6 g of acrylic acid, 7.79 g of styrene, 1.48 g of 2-ethylhexyl acrylate, and dibutyl peroxide were added dropwise over a period of 1 hour. After the drop, the addition polymerization reaction was allowed to age for 1 hour while maintaining the temperature at 160° C. The temperature of the mixture in the vessel was then raised to 210° C. 4.61 g of trimellitic anhydride was added to the vessel and the reaction was carried out at 210° C. for 2 hours. The reaction was carried out at 210° C. and 10 kPa until the desired softening point was reached. As a result, amorphous hybrid resin 1 was obtained. The obtained SP value of the amorphous hybrid resin 1 was 10.8. The weight averaged molecular weight of the amorphous hybrid resin 1 was 55,000, the number averaged molecular weight was 2,800, the glass transition temperature Tg was 55° C., and the acid value was 9.4 mgKOH/g.

<Synthesis of Organic Particles>

Production Example 1: Production of Fine Particle Dispersion (W0-1) Containing Organic Particles (A1)

3710 parts by mass of water and 200 parts by mass of ammonium polyoxyethylene-1-(allyloxymethyl) alkyl ether sulfate (Aqualon KH-1025, manufactured by Daiichi Kogyo Seiyaku) were placed in a reaction vessel equipped with a stirrer, a heating/cooling device, and a thermometer, and stirred at 200 rpm to homogenize the mixture. After heating the mixture in the reaction vessel to a system temperature of 75° C., 90 parts by mass of a 10% by mass of ammonium persulfate solution were added, and then a mixture consisting of 450 parts by mass of styrene, 250 parts by mass of butyl acrylate, and 300 parts by mass of methacrylic acid was added dropwise over a period of 4 hours. After dropping, a fine particle dispersion (W0-1) containing organic particles (A1) consisting of resin (a1-1), which is a polymer copolymerized of styrene, butyl acrylate, methacrylic acid, and ammonium polyoxyethylene-1-(allyloxymethyl) alkyl ether sulfate, was obtained by aging at 75° C. for 4 hours.

The volume average particle size of the organic particles (A1) in the fine particle dispersion (W0-1) was 15 nm. The volume average particle size was measured using a laser doppler particle size distribution measuring device (nanotrac UPA-150EX, manufactured by Nikkiso Co., Ltd.).

Moreover, a part of the particle dispersion (W0-1) was dried, and the resin (a1-1) which is an organic particle (A1) was isolated. The glass transition temperature Tg of this resin (a1-1) was 53° C., and the acid value was 195 mgKOH/g.

Production Example 1: Production of Fine Particle Dispersion (W0-1) Containing Organic Particles (A1)

Next, 667 parts by mass of the fine particle dispersion (W0-1) and 248 parts by mass of water were charged into a reaction vessel equipped with a stirrer, a heating/cooling device and a thermometer. After adding 0.267 parts by mass of tertiary butyl hydroperoxide (Perbutyl H, manufactured by NOF), the mixed solution was heated to raise the temperature inside the system to 70° C. Then, 43.3 parts by mass of styrene, 23.3 parts by mass of butyl acrylate, and 18.0 parts by mass of a 1% by mass of ascorbic acid aqueous solution were added dropwise to the mixed solution over 2 hours. After dropping, the mixture was aged at 70° C. for 4 hours to obtain a particle dispersion (W0-1) containing organic particles (A1-1) consisting of resin (a2-1), which is a polymer copolymerized with styrene and butyl acrylate, and resin (a1-1), which is a polymer copolymerized with styrene and butyl acrylate, as constituent components in the same particles, seeded with the fine particles in the particle dispersion (W0-1). The particle dispersion containing organic particles (A1-1) consisting of resin fine particles that contain styrene and butyl acrylate copolymerized polymer (a2-1) and resin (a1-1) as constituent components in the same particle was obtained. Water was added to the resulting particle dispersion to achieve a solid content concentration of 20%, and the particle dispersion (W-1) was obtained.

The volume average particle size of the organic particles (A1-1) was 17.3 nm. The volume average particle sizer was measured in the same manner as the above organic particles (A1).

The particle dispersion (W-1) was neutralized with a 10% by mass of ammonia solution to pH 9.0, and the resin (a2-1) in the organic particles (A1-1) was isolated by centrifuging the precipitate to dryness. The glass transition temperature Tg of the resin (a2-1) was 53° C.

It was confirmed that the particle dispersion (W-1) contained organic particles (A-1) that contained resin (a1-1) and resin (a2-1) as constituent components in the same particles, in the same way as in Production Example 1 above, by drying a portion of the particle dispersion (W-1) to isolate the organic particles (A-1).

Production Example 3: Aqueous Dispersion (W0-2) Containing Organic Particles (A2)

3760 parts by mass of water and 150 parts by mass of ammonium polyoxyethylene-1-(allyloxymethyl) alkyl ether sulfate (Aqualon KH-1025, manufactured by Daiichi Kogyo Seiyaku) were placed in a reaction vessel equipped with a stirrer, a heating/cooling device, and a thermometer, and stirred at 200 rpm to homogenize the mixture. After heating the mixture in the reaction vessel to a system temperature of 75° C., 90 parts by mass of a 10% by mass of ammonium persulfate solution were added, and then a mixture consisting of 430 parts by mass of styrene, 270 parts by mass of butyl acrylate, and 300 parts by mass of methacrylic acid was added dropwise over a period of 4 hours. After dropping, a fine particle dispersion (W0-2) containing organic particles (A2) consisting of resin (a1-2), which is a polymer copolymerized of styrene, butyl acrylate, methacrylic acid, and ammonium polyoxyethylene-1-(allyloxymethyl) alkyl ether sulfate, was obtained by aging at 75° C. for 4 hours.

The volume average particle size of the fine particles in the fine particle dispersion (W0-2) was 30 nm. The volume average particle size was measured in the same way as for the organic particles (A1) described above.

A portion of the fine particle dispersion (W0-2) was dried to isolate the resin (a1-2), which is organic particles (A2). The glass transition temperature Tg of the resin (a1-2) was 53° C., and the acid value was 195 mgKOH/g.

Production Example 4: Production of Aqueous Dispersion (W-2) Containing Organic Particles (A2-1)

Next, 667 parts by mass of the fine particle dispersion (W0-2) and 248 parts by mass of water were charged into a reaction vessel equipped with a stirrer, a heating/cooling device, and a thermometer. After adding 0.267 parts by mass of tertiary butyl hydroperoxide (Perbutyl H, manufactured by NOF), the mixed solution was heated to raise the temperature inside the system to 70° C. Then, 43.3 parts by mass of styrene, 23.3 parts by mass of butyl acrylate, and 18.0 parts by mass of a 1% by mass of ascorbic acid aqueous solution were added dropwise to the mixed solution over 2 hours. After dropping, the mixture was aged at 70° C. for 4 hours to obtain a particle dispersion containing organic particles (A2-1) consisting of resin (a2-2), which is a polymer copolymerized with styrene and butyl acrylate, and resin (a1-2), which is a polymer copolymerized with styrene and butyl acrylate, as constituent components in the same particles, seeded with the particles in the particle dispersion (W0-2). Water was added to the resulting particle dispersion to achieve a solid content concentration of 20%, and the particle dispersion (W-2) was obtained.

The volume average particle size of the organic particles (A2-1) was 34.3 nm. The volume average particle size was measured in the same way as for the organic particles (A1-1) described above.

The resin (a2-2) in the organic particles was isolated by neutralizing the fine particle dispersion (W-2) with a 10% by mass of ammonia solution to pH 9.0, and then centrifuging the precipitate to dry. The glass transition temperature Tg of the resin (a2-2) was 53° C.

It was confirmed that the particle dispersion (W-2) contained organic particles (A2-1) that contained resin (a1-2) and resin (a2-2) as constituent components in the same particles, in the same way as in Production Example 1 above, by drying a portion of the particle dispersion (W-2) to isolate the organic particles (A2-1).

Production Example 5: Aqueous Dispersion (W0-3) Containing Organic Particles (A3)

3810 parts by mass of water and 100 parts by mass of ammonium polyoxyethylene-1-(allyloxymethyl) alkyl ether sulfate (Aqualon KH-1025, manufactured by Daiichi Kogyo Seiyaku) were placed in a reaction vessel equipped with a stirrer, a heating/cooling device, and a thermometer, and stirred at 200 rpm to homogenize the mixture. After heating the mixture in the reaction vessel to a system temperature of 75° C., 90 parts by mass of a 10% by mass of ammonium persulfate solution were added, and then a mixture consisting of 400 parts by mass of styrene, 300 parts by mass of butyl acrylate, and 300 parts by mass of methacrylic acid was added dropwise over a period of 4 hours. After dropping, a fine particle dispersion (W0-3) containing organic particles (A3) consisting of resin (a1-3), which is a polymer copolymerized of styrene, butyl acrylate, methacrylic acid, and ammonium polyoxyethylene-1-(allyloxymethyl) alkyl ether sulfate, was obtained by aging at 75° C. for 4 hours.

The volume average particle size of the fine particles in the fine particle dispersion (W0-3) was 45 nm. The volume average particle size was measured in the same way as for the organic particles (A1-1) described above.

A portion of the fine particle dispersion solution (W0-3) was dried to isolate the resin (a1-3), which is organic particles (A3). The glass transition temperature Tg of the resin content (a1-3) was 53° C., and the acid value was 195 mgKOH/g.

Production Example 6: Production of Aqueous Dispersion (W-3) Containing Organic Particles (A3-1)

Next, 667 parts by mass of the fine particle dispersion (W0-3) and 248 parts by mass of water were charged into a reaction vessel equipped with a stirrer, a heating/cooling device, and a thermometer. After adding 0.267 parts by mass of tertiary butyl hydroperoxide (Perbutyl H, manufactured by NOF), the mixed solution was heated to raise the temperature inside the system to 70° C. Then, 43.3 parts by mass of styrene, 23.3 parts by mass of butyl acrylate, and 18.0 parts by mass of a 1% by mass of ascorbic acid aqueous solution were added dropwise to the mixed solution over 2 hours. After dropping, the mixture was aged at 70° C. for 4 hours to obtain a particle dispersion of organic particles (A3-1) containing organic particles (A2-1) consisting of resin (a2-3), which is a polymer copolymerized with styrene and butyl acrylate, and resin (a1-3), which is a polymer copolymerized with styrene and butyl acrylate, as constituent components in the same particles, seeded with the fine particles in the particle dispersion (W0-3). Water was added to the resulting particle dispersion to achieve a solid content concentration of 20%, and the particle dispersion (W0-3) was obtained.

The volume average particle size of the organic particles (A3-1) was 51.5 nm. The volume average particle size was measured in the same way as for the organic particles (A1-1) described above.

The resin (a2-3) was isolated by neutralizing the fine particle dispersion (W-3) with a 10% by mass of ammonia solution to pH 9.0, and then centrifuging the precipitate to dryness. The glass transition temperature Tg of the resin (a2-3) was 53° C.

It was confirmed that the particle dispersion (W-3) contained organic particles (A3-1) that contained resin (a1-3) and resin (a2-3) as constituent components in the same particles, in the same way as in Production Example 1 above, by drying a portion of the particle dispersion (W-3) to isolate the organic particles (A3-1).

Production Example 9: Production of Modified Wax 454 parts by mass of xylene and 150 parts by mass of low molecular weight polyethylene (SANWAX LEL-400, manufactured by Sanyo Chemical Industries) were charged into a pressure-resistant reaction vessel equipped with a stirrer, a heating/cooling device, a thermometer, and a dropping cylinder, and nitrogen was substituted. Then, the temperature of the mixture was raised to 170° C. under stirring, and at the same temperature, a mixed solution of 595 parts by mass of styrene, 255 parts by mass of methyl methacrylate, 34 parts by mass of di-t-butyl peroxy hexahydroterephthalate, and 119 parts by mass of xylene was added dropwise over a period of 3 hours, and further held at the same temperature for 30 minutes. Then, xylene was removed under reduced pressure of 0.039 MPa to obtain modified wax 1.

The sp value of the graft chain of the obtained modified wax 1 was 10.35 $(cal/cm^3)^{1/2}$, the number averaged molecular weight Mn was 1900, the weight averaged molecular weight Mw was 5200, and the glass transition temperature Tg was 57° C.

<Production of Toner>

Example 1

(Preparation of Wax Dispersion)

In a container equipped with a stirring rod and a thermometer, 50 parts by mass of paraffin wax (HNP-9, hydrocarbon wax, melting point 75° C., SP value 8.8, manufactured by Japan wax solder Co., Ltd.) as a release agent, 5 parts by mass of modified wax 1, and 165 parts by mass of ethyl acetate were prepared. The temperature was raised to 80° C. and kept at 80° C. for 5 hours. After that, the mixed liquid in the container was cooled to 30° C. in 1 hour, and dispersion was carried out using a bead mill (Ultra viscomill, manufactured by Imex) with a feed rate of 1 kg/hr, a disc peripheral speed of 6 m/sec to fill zirconia beads with a diameter of 0.5 mm for 80% by volume, under the condition of three passes. As a result, wax dispersion was obtained.

(Preparation of Mater Batch)

1200 parts by mass of water, 500 parts by mass of carbon black (Printex 35, manufactured by Degussa, DBP oil absorption=42 ml/100 mg, pH=9.5), and 500 parts by mass of amorphous polyester resin 1 were mixed with a Henschel mixer (manufactured by Mitsui Mining Co., Ltd.). The mixture was kneaded at 150° C. for 30 minutes using two rolls. Master batch 1 was then obtained by roll-cooling and pulverizing in a pulverizer.

(Preparation of Oil Phase)

21 parts by mass of the wax dispersion, 47 parts by mass of the crystalline polyester dispersion 1, 49 parts by mass of the amorphous polyester 1, 5 parts by mass of the amorphous hybrid resin, 17 parts by mass of the master batch 1, and 30 parts by mass of ethyl acetate were charged into a container, and mix with a TK homomixer (manufactured by Tokushu Kika Co., Ltd.) at 5,000 rpm for 60 minutes to obtain the oil phase.

(Preparation of Water Phase)

A milky white liquid was obtained by mixing and stirring 256 parts by mass of water, 5 parts by mass of fine particle dispersion solution (W-1), 10 parts by mass of fine particle dispersion solution (W0-1), 26 parts by mass of 48.5% aqueous solution of sodium dodecyl diphenyl ether disulfonate (ELEMINOL MON-7, manufactured by Sanyo Chemical Industries, Ltd.), and 24 parts by mass of ethyl acetate were mixed and stirred to obtain a milky white liquid. This was used as the aqueous phase.

(Emulsification and Removal of Solvent)

To the container containing the oil phase, 14 parts by mass of prepolymer 1 and 0.2 parts by mass of isophoronediamine which is a curing agent were added and mixed to obtain a mixed solution. The aqueous phase was added to the resulting mixed liquid and mixed with a TK homomixer at a rotation speed of 13,000 rpm for 20 minutes to obtain an emulsified slurry. Next, the emulsified slurry was put into a container equipped with an agitator and thermometer, and the solvent was removed at 30° C. for 8 hours, followed by aging at 45° C. for 4 hours to obtain a dispersed slurry.

(Washing and Drying)

100 parts by mass of the dispersion slurry was filtered under reduced pressure, and the following operations were then performed.

(1) 100 parts by mass of ion exchange water was added to the filtered cake, and mixed them with a TK homomixer (12,000 rpm for 10 minutes), followed by being filtered.

(2) 10% sodium hydroxide solution was added to the filtered cake of the above (1) until it reached pH 11, and mixed with a TK homomixer at 12,000 rpm for 30 minutes, followed by being filtered under reduced pressure.

(3) 10% hydrochloric acid was added to the filtered cake of the above (2) until it reached pH 4-5, and mixed with a TK homomixer at 12,000 rpm for 10 minutes, followed by being filtered.

(4) 300 parts by mass of ion exchange water was added to the filtered cake of the above (3) and mixed with a TK homomixer at 12,000 rpm for 10 minutes, followed by being filtered.

The above (1) to (4) were repeated twice to obtain a filtered cake.

The resulting filtered cake was dried in a circulating dryer at 45° C. for 48 hours, and then sieved through a mesh with a mesh opening of 75 μm to obtain toner base particles.

(External Additive Treatment)

Figure 4:
FIG. 4 is an SEM photograph of the toner in Example 1.

The toner was obtained by mixing 0.6 parts by mass of hydrophobic silica with an average particle size of 100 nm, 1.0 part by mass of titanium dioxide with an average particle size of 20 nm, and 0.8 parts by mass of hydrophobic silica fine powder with an average particle size of 15 nm with a Henschel mixer with respect to 100 parts by mass of the obtained toner base particles. The SEM photograph of the obtained toner is illustrated in FIG. 4. As illustrated in FIG.

4, it can be confirmed that the organic particles are scattered on the surface of the toner base particles in an embedded state.

(Preparation of Developing Agent)

Using a ball mill, 5 parts by mass of toner and 95 parts by mass of carrier were mixed to produce a developing agent.

(Preparation of Carrier)

The carrier was prepared as follows. 100 parts by mass of silicone resin (organostratosilicone), 5 parts by mass of γ-(2-aminoethyl) aminopropyl trimethoxysilane, and 10 parts by mass of carbon black were added to 100 parts by mass of toluene, and dispersed with a homomixer for 20 minutes to prepare a resin layer coating solution. Using a fluidized-bed coating system, a carrier was prepared by applying the resin layer coating solution to the surface of 1000 parts by mass of spherical magnetite with an average particle size of 50 μm.

Example 2

Example 2 was carried out in the same manner as in Example 1 except for the following. The content of fine particle dispersion (W-1) used in (Preparation of Aqueous Phase) was changed to 2.5 parts by mass, and the content of [Fine Particle Dispersion (W0-1)] was changed to 12.5 parts by mass.

Example 3

Example 3 was carried out in the same manner as in Example 1 except for the following. The content of amorphous hybrid resin used in (Preparation of Oil Phase) was changed to 2 parts by mass, and the content of amorphous polyester resin 1 was changed to 52 parts by mass.

Example 4

Example 4 was carried out in the same manner as in Example 1 except for the following. The content of amorphous hybrid resin used in (Preparation of Oil Phase) was changed to 10 parts by mass, and the content of amorphous polyester resin 1 was changed to 46 parts by mass.

Example 5

Example 5 was carried out in the same manner as in Example 1 except for the following. The fine particle dispersion (W-1) used in (Preparation of Aqueous Phase) was changed to the fine particle dispersion (W-2), and the fine particle dispersion (W0-1) was changed to the fine particle dispersion (W0-2). In addition, the content of the fine particle dispersion (W-2) was changed to 10 parts by mass, and the content of the fine particle dispersion (W0-2) was changed to 5 parts by mass.

Example 6

Example 6 was carried out in the same manner as in Example 1 except for the following. The fine particle dispersion (W-1) used in (Preparation of Aqueous Phase) was changed to the fine particle dispersion (W-2), and the fine particle dispersion (W0-1) was changed to the fine particle dispersion (W0-2). In addition, the content of the fine particle dispersion (W-2) was changed to 5 parts by mass, and the content of the fine particle dispersion (W0-2) was changed to 10 parts by mass.

Example 7

Example 7 was carried out in the same manner as in Example 1 except for the following. The fine particle dispersion (W-1) used in (Preparation of Aqueous Phase) was changed to the fine particle dispersion (W-2), and the fine particle dispersion (W0-1) was changed to the fine particle dispersion (W0-2). In addition, the content of the fine particle dispersion (W-2) was changed to 12.5 parts by mass, and the content of the fine particle dispersion (W0-2) was changed to 2.5 parts by mass.

Example 8

Example 8 was carried out in the same manner as in Example 1 except for the following. The content of amorphous hybrid resin used in (Preparation of Oil Phase) was changed to 0.6 parts by mass, and the content of amorphous polyester resin 1 was changed to 52 parts by mass. The fine particle dispersion (W-1) used in (Preparation of Aqueous Phase) was changed to the fine particle dispersion (W-2), and the fine particle dispersion (W0-1) was changed to the fine particle dispersion (W0-2). In addition, the content of the fine particle dispersion (W-2) was changed to 3.0 parts by mass, and the content of the fine particle dispersion (W0-2) was changed to 12.0 parts by mass.

Example 9

Example 9 was carried out in the same manner as in Example 1 except for the following. The content of crystalline polyester dispersion 1 used in (Preparation of Oil Phase) was changed to 95 parts by mass, the content of amorphous hybrid resin was changed to 17 parts by mass, and the content of amorphous polyester resin 1 was changed to 38 parts by mass.

Example 10

Example 10 was carried out in the same manner as in Example 1 except for the following. The content of crystalline polyester dispersion 1 used in (Preparation of Oil Phase) was changed to 23 parts by mass, and the content of amorphous hybrid resin was changed to 0 parts by mass.

Comparative Example 1

Comparative Example 1 was carried out in the same manner as in Example 1 except for the following. The fine particle dispersion (W-1) used in (Preparation of Aqueous Phase) was changed to the fine particle dispersion (W-2), and the fine particle dispersion (W0-1) was changed to the fine particle dispersion (W0-2). Furthermore, the content of fine particle dispersion (W-2) was changed to 4 parts by mass, and the content of fine particle dispersion (W0-2) was changed to 18 parts by mass.

Comparative Example 2

Comparative Example 2 was carried out in the same manner as in Example 1 except for the following. The content of amorphous polyester resin 1 used in (Preparation of Oil Phase) was changed to 54 parts by mass, and the content of amorphous hybrid resin was changed to 0 parts by mass.

Comparative Example 3

Comparative Example 3 was carried out in the same manner as in Example 1 except for the following. The fine particle dispersion (W-1) used in (Preparation of Aqueous Phase) was changed to the fine particle dispersion (W-3), and the fine particle dispersion (W0-1) was changed to the fine particle dispersion (W0-3).

Comparative Example 4

Comparative Example 4 was carried out in the same manner as in Example 1 except for the following. The fine particle dispersion (W-1) used in (Preparation of Aqueous Phase) was changed to the fine particle dispersion (W-3), and the fine particle dispersion (W0-1) was changed to the fine particle dispersion (W0-3). Furthermore, the content of fine particle dispersion (W-2) was changed to 6 parts by mass, and the content of fine particle dispersion (W0-2) was changed to 9 parts by mass.

Comparative Example 5

Comparative Example 5 was carried out in the same manner as in Example 1 except for the following. The content of amorphous polyester resin 1 used in (Preparation of Oil Phase) was changed to 54 parts by mass, and the content of amorphous hybrid resin was changed to 0 parts by mass. The fine particle dispersion (W-1) used in (Preparation of Aqueous Phase) was changed to the fine particle dispersion (W-3), and the fine particle dispersion (W0-1) was changed to the fine particle dispersion (W0-3). Furthermore, the content of the fine particle dispersion (W-3) was changed to 13.0 parts by mass, and the content of fine particle dispersion (W0-3) to 2.0 parts by mass.

<Distance Between Organic Particles>

The distance between the organic particles on the surface of the toner base particles constituting the toners of each of the obtained Examples and Comparative Examples was measured. First, the toner was treated by freeing the external additive agents using ultrasonic waves to remove as much of the external additive agents as possible and make it closer to the toner base particles.

[Method of Freeing External Additive Agents]

[1] 50 ml of a 5, aqueous solution containing a surfactant (product name: NOIGEN ET-165, manufactured by Daiichi Kogyo Seiyaku Co., Ltd.) was added to a 100 ml screw tube, and 3 g of toner was added to the mixture, followed by gently moving the mixture up and down, left and right. The toner was then agitated in a ball mill for 30 minutes to allow the toner to blend into the dispersion solution.

[2] Ultrasonic waves were applied to the mixture at 40 W for 60 minutes with use of an ultrasonic homogenizer (homogenizer, model VCX750, CV33, manufactured by SONICS & MATERIALS Inc.).

(Conditions for Ultrasonic Waves)
Vibration time: 60 minutes continuous
Amplitude: 40 W
Vibration Initiation temperature: 23±1.5° C.
Temperature during vibration: 23±1.5° C.

[3] (1) The dispersion solution was suction-filtered through filter paper (qualitative filter paper (No. 2, 110 mm), manufactured by Advantech Toyo Co., Ltd.), and then filtered again by washing twice with ion exchange water. After removing the free additive agents, the toner was dried.

(2) The toner obtained in (1) was observed by scanning electron microscopy (SEM). First, Si-containing external additive agents and fillers were detected by observing the backscattered electron image.

(3) The image obtained in (2) was binarized using image processing software (ImageJ) to eliminate the external additive agents and fillers.

(4) Next, a secondary electron image was observed at the same position as in (2). The organic particles are not observed in the backscattered electron image, but only in the secondary electron image. Therefore, the image was checked against the image obtained in (3), and the particles present in the areas other than the remaining external additive agents and fillers (other than those eliminated in (3)) were considered to be organic particles. The distance between the fine particles (distance between the centers of the fine particles) was measured using image processing software. The standard deviation of the distance between organic particles was calculated using the following formula (I) with the distance between fine particles as x.

[Math Formula 1]

$$\sqrt{\frac{1}{n-1}\sum_{k=1}^{n}(x_i - \bar{x})} \quad (1)$$

(Photographic Conditions)
Scanning electron microscope: SU-8230
Magnification: 35000×
Images taken: SE (L): secondary electrons, BSE (backscattered electrons)
Acceleration voltage: 2.0 kV
Acceleration current: 1.0 μA
Probe current: Normal
Focus mode: UHR
WD: 8.0 mm <Toner $Tg_{1st}$, THF Insoluble Content $Tga_{1st}$, THF Soluble Content $Tg_{2nd}$, $Tg_{1st}$ of Organic Particles>

1 g of the toner was charged into 100 mL of THF, and Soxhlet extraction was performed to obtain the THF soluble and insoluble contents. The THF soluble content was dried in a vacuum dryer for 24 hours, and polyester resin (a mixture with crystalline polyester in Examples 9 to 11) was obtained from the THF soluble content, and polyester resin was obtained from the THF insoluble content. These were used as the target samples. The toner was also used as the target sample for measuring toner $Tg_{1st}$ and toner $Tg_{2nd}$.

Next, about 5.0 mg of the target sample was placed in an aluminum sample container, and the sample container was placed on the holder unit and set in the electric furnace. Then, the same was heated from −80° C. to 150° C. at a temperature increase rate of 1.0° C./min (the first temperature rise) under a nitrogen atmosphere. The sample was then cooled from 150° C. to −80° C. at a rate of 1.0° C./min, and then heated to 150° C. at a rate of 1.0° C./min (the second temperature rise). DSC curves were measured using a differential scanning calorimeter ("Q-200", manufactured by TA Instruments) at each of the first and second temperature rise.

From the obtained DSC curve, the DSC curve at the first temperature rise was selected using the analysis program in the Q-200 system, and the glass transition temperature $Tg_{1st}$ at the first temperature rise of the target sample was obtained. Similarly, the DSC curve at the second temperature rise was selected to obtain the glass transition temperature $Tg_{2nd}$ at the second temperature rise of the target sample.

From the obtained DSC curve, the DSC curve at the first temperature rise was selected using the analysis program in the Q-200 system, and the endothermic peak top temperature of the target sample at the first temperature rise was determined as the melting point. Similarly, the DSC curve at the second temperature rise was selected, and the endothermic peak top temperature at the second temperature rise of the target sample was determined as the melting point.

Unless otherwise specified, the melting point and glass transition temperature Tg of other components such as polyester resin components A, B, and C, release agent, and the like shall be the endothermic peak top temperature and glass transition temperature $Tg_{2nd}$ at the second temperature rise as the melting point and glass transition temperature Tg of each target sample.

In the THF insoluble component of the toner, the modulation mode was used to heat the toner from −80° C. to 150° C. at a temperature increase rate of 1.0° C./min while giving a modulation temperature amplitude: 11.0° C./min (the first temperature rise). Then, the DSC curve was obtained by taking the "Reversing Heat F row" as the vertical axis using the analysis program in the Q-200 system as well as the obtained DSC curve, and the onset value illustrated in FIG. 3 was set as the glass transition temperature Tg. The onset values illustrated in FIG. 3 were used as the glass transition temperature Tg. Accordingly, $Tga_{1st}$, $Tgb_{1st}$, and $Tg_{2nd}$, were obtained.

<Evaluation of Characteristics of Toner>

Next, the characteristics of the toner were evaluated using each of the prepared developing agent as follows. The results of each evaluation are indicated in Table 1.

[Low-Temperature Fixing]

The toner was evenly placed on the paper surface so that the toner was placed so as to be 0.8 mg/cm². To place the toner on the paper surface, a printer (Ricoh MPC 6003, manufactured by Ricoh Co., Ltd.) with the thermal fixer removed. The temperature at which cold offset generates (Minimum Fixing Temperature (MFT)) was measured when the paper was passed through the pressure roller at a fixing speed (heating roller peripheral speed) of 213 mm/second and a fixing pressure (pressure roller pressure) of 10 kg/cm².

(Criteria of Cold Offset Evaluation)

A: Minimum fixing temperature is 130° C.

B: Minimum fixing temperature is higher than 130° C. and 135° C. or lower.

C: Minimum fixing temperature is higher than 135° C. and 140° C. or lower.

D: Minimum fixing temperature is higher than 140° C.

[Heat-Resistant-Storage Property]

After storing the toner at 50° C. for 8 hours, the toner was sieved with a 42-mesh sieve for 2 minutes and the residual percentage on the wire mesh was measured. The toner with excellent heat-resistant-storage property showed less residual percentage. The heat-resistant-storage property was evaluated based on the following evaluation criteria.

(Evaluation Criteria)

A: The residual percentage is less than 5%.

B: The residual percentage is 5% or higher and less than 15%.

C: The residual percentage is 15% or higher and less than 30%.

D: The residual percentage is 30% or higher.

[Cleaning Performance (Photoconductor Contamination)]

Using an imaging forming apparatus (Ricoh MPC 6003, manufactured by Ricoh Co., Ltd.), 50,000 sheets (A4 size, horizontal) of 5% image area charts were output at 3 prints/job in a laboratory environment of 21° C. and 65% RH. Then, in a laboratory environment (32° C., 54% RH), 100 sheets of a vertical strip pattern (against the paper direction) with 43 mm width and 3-strip chart were output as the evaluation image in A4 size horizontally, and the obtained image was visually observed to evaluate the cleaning performance by the presence or absence of image abnormalities due to cleaning failure.

(Cleaning Criteria)

A: Toner that has slipped through due to cleaning failure cannot be visually seen on the printed paper and on the photoconductor, and no toner slippage in the form of streaks can be seen when the photoconductor is observed under a microscope in the longitudinal direction.

B: Toner that has slipped through due to poor cleaning cannot be visually seen on the printing paper and on the photoconductor.

D: Toner that has slipped through due to poor cleaning can be visually seen both on the printing paper and on the photoconductor.

[Filming of Additive Agents (Inorganic Particles)]

Using an imaging forming apparatus (Ricoh MPC 6003, manufactured by Ricoh Co., Ltd.), 5,000 sheets (A4 size, horizontal) of 30% image area charts were output at 3 prints/job in a laboratory environment of 27° C. and 90% RH. Then, after outputting 5,000 sheets (A4 size, horizontal) of blank paper at 3 prints/job, the photoconductor was visually observed after printing one halftone image, and the filling condition was evaluated on the following evaluation criteria.

(Evaluation Criteria)

A: These is no problem with the photoconductor, and there is no problem with the image quality.

B: There is a slight filming in the print direction, but there is no quality problem in the image.

D: Filming is clearly generated on the photoconductor, and there is a problem on the image quality.

[Overall Evaluation]

The overall evaluation was evaluated according to the following evaluation criteria. Those with all evaluation items of A or B was evaluated as A; those with three or more of A or B, and those with one C was evaluated as B, and determined that there is no problem on usage; and those with one or more of D was evaluated as D.

(Evaluation Criteria)

A: Excellent

B: Good

D: Not for practical use

The following table indicates the results of each evaluation of the toner: the percentage of crystalline polyester resin occupying the surface of the toner base particles, the particle size of the organic particles, the standard deviation of the distance between particles, the presence or absence of amorphous hybrid resin, the glass transition temperature $Tg_{1st}$ of the toner, the glass transition temperature $Tg_{1st}$ of the THF insoluble content of the toner, the glass transition temperature $Tg_{1st}$ of the THF soluble content of the toner.

TABLE 1

| | | Examples | | | | | | | | | | Comparative Examples | | | | |
|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 |
| Toner | Percentage of crystalline polyester resin occupying surface of toner base particles [%] | 11 | 11 | 13 | 4.5 | 11 | 11 | 4.5 | 18 | 18 | 17 | 11 | 24 | 11 | 11 | 24 |
| | Particle size of organic particles [nm] | 17.3 | 17.3 | 17.3 | 17.3 | 34.3 | 34.3 | 34.3 | 34.3 | 17.3 | 17.3 | 34.3 | 17.3 | 51.5 | 51.5 | 51.5 |
| | Standard deviation between organic particles [nm] | 63 | 285 | 65 | 85 | 200 | 410 | 81 | 475 | 67 | 91 | 520 | ≤100 | 330 | 550 | 253 |
| | Presence or absence of amorphous hybrid resin | Containing | | | | | | | | | | Not containing | Containing | Not containing | Containing | Not containing |
| | $Tg_{1st}$ [° C.] of toner | 42 | 43 | 46 | 44 | 43 | 45 | 42 | 41 | 42 | 42 | 42 | 47 | 41 | 44 | 44 |
| | $Tg_{1st}$ [° C.] of THF insoluble content of toner | −37 | −37 | −37 | −37 | −37 | −37 | −37 | −37 | −37 | −37 | −37 | −37 | −37 | −37 | −37 |
| | $Tg_{2nd}$ [° C.] of THF soluble content of toner | 53 | 53 | 53 | 53 | 53 | 53 | 53 | 53 | 53 | 53 | 53 | 53 | 53 | 53 | 53 |
| Evaluation | Low-temperature fusing | A | A | A | B | B | B | C | B | A | C | A | A | D | C | D |
| | Heat resistance storage property | A | A | B | A | A | A | A | B | C | B | C | D | A | B | C |
| | Cleaning performance | A | B | A | A | A | B | A | B | B | A | D | B | B | D | B |
| | Filming | B | B | B | B | A | A | A | A | B | B | D | B | B | D | A |
| | Overall Evaluation | A | A | A | A | A | A | B | A | B | B | D | D | D | D | D |

From Table 1, it was confirmed that the toners of Examples 1 to 10 satisfied the conditions for use in terms of low-temperature fixing, heat-resistant-storage property, cleaning performance, and filming. In contrast, at least one of the toners obtained in Comparative Examples 1 to 5 did not meet the conditions for use in terms of low-temperature fixing, heat-resistant-storage property, cleaning performance, and filming, resulting in unacceptable deterioration of quality. Therefore, it was confirmed that the toners obtained in Comparative Examples 1 to 5 could not achieve all of the required characteristics and had practical problems.

Therefore, the toners of Examples 1 to 10 differ from the toners of Comparative Examples 1 to 5 in that the percentage of crystalline polyester resin occupying the surface of the toner base particles is 4% to 20%, the volume average particle size of the organic particles is 10 nm to 40 nm, and the standard deviation of the distance between adjacent particles of organic particles that are not in contact with each other is 500 nm or less. As a result, it can be said that the toners of Examples 1 to 10 are high quality toners with excellent low-temperature fixing, heat-resistant-storage property, cleaning performance, and filling.

As described above, the above embodiments are presented as examples, and the invention is not limited by the above embodiments. The above embodiments may be implemented in various other forms, and various combinations, omissions, substitutions, changes, etc. may be made without departing from the gist of the invention. These embodiments and variations thereof are included in the scope and gist of the invention, as well as in the scope of the invention and its equivalents described in the claims.

What is claimed is:

1. A toner, comprising toner base particles which comprise a crystalline polyester resin, an amorphous polyester resin and an amorphous hybrid resin, comprising:
    a plurality of organic particles comprising resin particles comprising a styrene acrylic resin, disposed at least partially embedded in a surface of the toner base particles,
    wherein a percentage of the crystalline polyester resin occupying the surface of the toner base particles is 4% to 20%,
    a volume average particle size of the organic particles is 10 nm to 34.3 nm,
    a standard deviation of a distance between adjacent particles of the organic particles that are not in contact is 500 nm or less,
    said organic particles comprise:
    organic particles (A) comprising styrene acrylic resin (a1) and styrene acrylic resin (a2); and
    organic particles (B) comprising one type of styrene acrylic resin (a1), and
    said amorphous hybrid resin comprises a polyester resin and a styrene resin which are partially chemically bonded.

2. The toner according claim 1, wherein said styrene acrylic resin (a1) and (a2) each independently comprises a constitutional unit derived from a carboxylic acid.

3. The toner according to claim 1, wherein a content of the organic particles with respect to a total mass of the toner base particles is 0.2% by mass to 5% by mass.

4. The toner according to claim 1, wherein a percentage of the crystalline polyester resin occupying the surface of the toner base particles is 10% to 15%.

5. The toner according to claim 1, wherein a glass transition temperature $Tg_{1st}$ at the first temperature rise in a differential scanning calorimetry of the toner is 40° C. to 65° C.,
    wherein a glass transition temperature $Tg_{1st}$ of a tetrahydrofuran-insoluble content of the toner at the first temperature rise in DSC is −45° C. to 5° C., and
    wherein a glass transition temperature $Tg_{2nd}$ of a tetrahydrofuran-soluble content of the toner at the second temperature rise in DSC, is 20° C. to 65° C.

6. The toner according to claim 1, wherein the amorphous polyester resin comprises a modified polyester.

7. The toner according to claim 6, wherein the modified polyester contains a trivalent or tetravalent aliphatic polyhydric alcohol component with 3 to 10 carbon atoms.

8. The toner according to claim 6, wherein the modified polyester contains a diol component, and the diol component has a carbon number of 3, 5, 7, or 9 in the main chain and an alkyl group in the side chain.

9. The toner according to claim 6, wherein the modified polyester has a urethane bond, a urea bond, or both.

10. A developing agent comprising the toner of claim 1, and a carrier.

11. A toner stored unit comprising the toner of claim 1.

12. An image forming apparatus comprising:
an electrostatic latent image carrier;
an electrostatic latent image forming part that forms an electrostatic latent image on the electrostatic latent image carrier;
a developing part that develops the electrostatic latent image using a toner to form a visible image;
a transfer part that transfers the visible image to a recording medium; and
a fixing part that fixes the transferred image on the recording medium,
wherein the toner is the toner of claim 1.

13. The toner according to claim 1, wherein styrene acrylic resin (a1) comprises a styrene acrylic resin comprising a constitutional unit derived from a carboxylic acid.

* * * * *